United States Patent
Uomori

(10) Patent No.: US 10,514,686 B2
(45) Date of Patent: Dec. 24, 2019

(54) OPERATION SUPPORT SYSTEM, OPERATION SUPPORT DEVICE, AND OPERATION SUPPORT METHOD

(71) Applicant: YOKOGAWA ELECTRIC CORPORATION, Tokyo (JP)

(72) Inventor: Yoshio Uomori, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 41 days.

(21) Appl. No.: 15/277,614

(22) Filed: Sep. 27, 2016

(65) Prior Publication Data

US 2017/0090466 A1  Mar. 30, 2017

(30) Foreign Application Priority Data

Sep. 29, 2015 (JP) .................. 2015-190693

(51) Int. Cl.
*G05B 19/418* (2006.01)
*G05B 23/02* (2006.01)

(52) U.S. Cl.
CPC ... *G05B 19/41875* (2013.01); *G05B 23/0216* (2013.01); *G05B 2219/23161* (2013.01);
(Continued)

(58) Field of Classification Search
CPC .......... G05B 19/41875; G05B 23/0216; G05B 2219/23161; G05B 2219/32014; G05B 2219/32179; G05B 2219/36061
(Continued)

(56) References Cited

U.S. PATENT DOCUMENTS 6,167,464 A 12/2000 Kretschmann
7,119,848 B2 * 10/2006 Smith ................ H04N 5/44543
348/564
(Continued)

FOREIGN PATENT DOCUMENTS

JP  11-353332 A  12/1999
JP  2002-189513 A  7/2002
(Continued)

OTHER PUBLICATIONS

Akira Sadakata, Equipment Management Method, Abnormality Confirmation Method and Equipment Management Server, Jul. 5, 2002, Translation of Japanese application JP 2002189513 (Year: 2002).*

(Continued)

*Primary Examiner* — Robert E Fennema
*Assistant Examiner* — Christopher W Carter
(74) *Attorney, Agent, or Firm* — Sughrue Mion, PLLC

(57) ABSTRACT

An operation support system for supporting an operation to each facility installed in a plant, the operation support system may include, but is not limited to, a data storage that stores historical data which represent information regarding operations performed to the facility as history, and at least one operation support device portable by a field operator, wherein the operation support device may include a position information acquirer configured to acquire a current position of the operation support device, and to output current position information, an inspection information processor configured to add information regarding the operation performed to the facility, and to output the current position information regarding position where the operation was performed to at least the facility that is associated with the historical data to data storage, and an operation supporter configured to represent information regarding the operation performed to the facility as operation information based on the historical data, and to enable one or more further functions regarding the operation associated with the operation information to be executed.

16 Claims, 10 Drawing Sheets

(52) U.S. Cl.
CPC .............. *G05B 2219/32014* (2013.01); *G05B 2219/32179* (2013.01); *G05B 2219/36061* (2013.01)

(58) Field of Classification Search
USPC ........................................................ 700/110
See application file for complete search history.

(56) References Cited

U.S. PATENT DOCUMENTS

| | | |
|---|---|---|
| 2012/0317064 A1 | 12/2012 | Hagiwara et al. |
| 2014/0247151 A1* | 9/2014 | Proud .................. A61B 5/0024 340/870.02 |
| 2016/0176724 A1 | 6/2016 | Ji et al. |

FOREIGN PATENT DOCUMENTS

| | | | |
|---|---|---|---|
| JP | 2004-127095 A | 4/2004 | |
| JP | 2013-003643 A | 1/2013 | |
| JP | 2014-149583 A | 8/2014 | |
| WO | WO-2014178838 A1 * | 11/2014 | ....... H04L 29/08657 |
| WO | 2015088124 A1 | 6/2015 | |

OTHER PUBLICATIONS

Katsuhiko Yokohama, Gasification Plant Operation Support Device and Method, Apr. 22, 2004, Translation of Japanese application JP 2004127095 (Year: 2004).*

Shingo Ito, Inspection Support System, Inspection Support Device, Inspection Support Method and Program, Aug. 21, 2014, Translation of Japanese application JP 2014149583 (Year: 2014).*

* cited by examiner

OPERATION SUPPORT SYSTEM, OPERATION SUPPORT DEVICE, AND OPERATION SUPPORT METHOD

BACKGROUND OF THE INVENTION

Field of the Invention

The present invention relates to an operation support system for supporting an operation in a plant, an operation support device, and an operation support method.

Priority is claimed on Japanese Patent Application No. 2015-190693, filed on Sep. 29, 2015, the contents of which are incorporated herein by reference.

Description of the Related Art

In a plant with a variety of facilities, for each of the facilities which is installed in a specific location in the plant, a routine inspection operation has been performed for initiating support upon detecting a failure or malfunction of the facilities. Field operators performing such operations, for example, make their rounds in the plant with carrying the inspection list such as papers or electronic mediums or the like, which indicate operation contents to be performed in each of the facilities. The field operators perform the operation based on a respective list of inspection in each of the facilities. In the routine inspection operation, the field operators visit to each of the facilities as the inspection target according to a pre-assigned inspection route. The field operators inspect the facilities for each of the inspection items based on the inspection list.

The field operators will replace and repair faulty parts when the field operators found the faulty parts in the facilities where the inspection is performed. In this case, the field operators, for example, try to look for a variety of materials such as a manual for replacement or repair of the parts and the history of the repair and the replacement of the parts in the past. Then, the field operators are expected to perform necessary tasks based on the materials. However, the field operators would take time to search the materials. It is difficult for the field operators to immediately replace and repair the faulty parts. Also, even if they can explore the materials, they can mistake their decision of whether to repair or to exchange.

Thus, for example, an inspection support system disclosed in Japanese Patent Application Publication No. 2014-149583 (hereinafter, referred to as Patent Reference 1) have been proposed. Patent Reference 1 discloses the techniques of searching the past repair history based on images of the faulty parts, and presenting recommendation to replace the parts and information regarding methods of repairing the faulty parts and the list of the parts. Thus, the field operators can readily determine a solution to the failure based on the presented information.

Further, for example, an information processing device disclosed in Japanese Patent Application Publication No. 2013-003643 (herein after referred to as Patent Reference 2) have been proposed. The Patent Reference 2 discloses generating information affecting user's behavior, and presenting information to the users, based on the information regarding user's behavior recognized by a behavior recognition algorithm and information of the user's satisfaction. The Patent Reference 2 discloses the techniques which is applicable to the operation support system. The operation support system can present the materials for trouble-shooting when the field operators find unexpected abnormality of the facilities.

DISCLOSURE OF THE INVENTION

Problems to be Solved by the Invention

However, in the actual plant, there is unexpected abnormality of a facility in the inspection route where the field operators making their rounds can hear abnormal noise, from inside of the pipe, and where water is accumulated around the facilities. In this case, the field operators would have to carry out a solution to a trouble which is not shown in the inspection list in a different place from the inspection target facility which is, hereinafter, referred to as "atypical operation".

However, although the Patent Reference 1 discloses assistance for the faulty parts in the inspection target facilities, and does not disclose assistance for the atypical operation.

If the field operators who found the unexpected abnormality of the facilities, have experience of a lot of operation in the plant, and if the field operators are skilled field operators who are familiar with the operation method for the trouble, even if the operation is the atypical operation, they can perform atypical operation immediately to the trouble based on the experiences of the skilled field operators.

However, if the field operators are less experienced, when they find the abnormal facilities, they may not be able to determine immediately whether to perform the atypical operation. Therefore, when the less experienced field operators have found the unexpected abnormal facilities, they have to search the materials in order to respond to the trouble in offices. It takes so much time to search for materials that they would not be able to immediately support to the trouble. Further, it is conceivable that the less experienced field operators may perform wrong operation because of their lack of experiences and knowledges, even though they perform the operation for associated with the trouble based on the searched materials.

One aspect of the present embodiment is to provide the operation support system, the operation support device, and the operation support method which can shorten the time required to collect information to respond to any trouble of respective facilities installed in the plant, and can support the operation to support to the trouble.

SUMMARY (1) In one embodiment, an operation support system for supporting an operation to a facility installed in a plant, the operation support system may include, but is not limited to, a data storage that stores historical data which represent information regarding operations performed to the facility as history, and at least one operation support device portable by a field operator, wherein the operation support device may include: a position information acquirer configured to acquire a current position of the operation support device, and to output current position information; an inspection information processor configured to add information regarding the operation performed to the facility, and to output the current position information regarding position where the operation was performed to at least the facility that is associated with the historical data to data storage; and an operation supporter configured to represent information regarding the operation performed to the facility as operation information based on the historical data, and to enable one or more further functions regarding the operation associated with the operation information to be executed.

(2) In some cases, the historical data may include the historical data comprises information regarding solution operations performed to the abnormality found in the past in the facility, the operation supporter is configured to defines information regarding the solution operation included in the historical data associated with the facility as solution if one or more of the abnormalities are found in the facility, and represent information of the solution representing one or more available solutions to each of the abnormalities, and to enable the functions which performs the operations associated with the solution selected in information regarding the represented solution to be executed.

(3) In some cases, the operation supporter is configured to represent information of the solution including the one or more available solutions sorted in term of abnormality in accordance with one or more predetermined conditions.

(4) In some cases, the operation supporter is configured to further add the selected information of the solution associated with performed operations to the historical data, and the one or more predetermined conditions are priorities depending upon selected numbers of the one or more available solutions.

(5) In some cases, the operation supporter is configured to add the selected information of the solution associated with performed operations to the historical data, and the one or more predetermined conditions are priorities depending upon recentness of date or time of selections to the one or more available solutions.

(6) In some cases, the operation supporter is configured to represent the solution list including each series of the one or more operations sorted associated with a respective abnormality in sequence.

(7) In some cases, the operation supporter is configured to represent information of the solution associated with the facility, if information indicating that the abnormality is found in the facility by an inspection information representing information associated with one or more operations included in the historical data is output.

(8) In some cases, the operation supporter is configured to represent information of the solution associated with the facility around the current position of the operation support device, if information indicating that the abnormality is found in the facility is represented by installation information illustrating arrangement of respective facilities with inspection route representing the order of performance of one or more operations.

(9) In some cases, the operation support device further includes a supporter behavior acquirer configured to acquire a behavior of the operation support device, and output supporter behavior information representing the detected behavior; and an operator behavior determiner configured to determine the behavior of the field operator based on the current position information and supporter behavior information, and output operator behavior information representing the determined behavior of the field operator; wherein the inspection information processor is configured to acquire the historical data associated with the facility from data storage if operator behavior information represents finding the abnormality in the facility, and the operation supporter is configured to represent the solution list based on the historical data acquired from the inspection information processor.

(10). In some cases, the operation support system comprises the operation support system comprises the inspection information processor outside the operation support device, the operation support device further comprises a supporter behavior acquirer configured to acquire a behavior of the operation support device, and to output supporter behavior information representing the behavior thereof, the operation support system further comprises an operator behavior determiner configured to determine the behavior of the field operator based on current position information and supporter behavior information, and to output operator behavior information representing the determined behavior of the field operator, the inspection information processor is configured to acquire the historical data associated with the facility from data storage if the operator behavior information represents finding abnormality in the facility, and the operation supporter is configured to represent information of the solution based on historical data which the inspection information processor acquired.

(11) In some cases, the operation support system further comprises a second supporter behavior acquirer which is portable to the field operator, and configured to acquire the behavior of the field operator carrying the operation support device, and to output second supporter behavior information representing the detected behavior, and the operator behavior determiner configured to determine the behavior of the field operator based on current position information, supporter behavior information, and second supporter behavior information, and output the operator behavior information representing the determined behavior of the field operator.

(12) According to an aspect of the present invention, there is provided an operation support device, which is portable by a field operator, for supporting an operation to a facility installed in a plant. The operation support device includes a position information acquirer configured to acquire a current position of the operation support device, and to output current position information; an inspection information processor configured to add information regarding the operations performed to the facility to historical data representing the operation performed in the facility, and to output the current position information regarding position where the operation was performed to at least the facility that is associated with the historical data; and an operation supporter configured to represent information regarding the operation performed to the facility as operation information based on the historical data, and to enable one or more further functions regarding the operation associated with the operation information to be executed.

(13) According to an aspect of the present invention, there is provided an operation supporting method for supporting operation to each facility installed in a plant. The operation supporting method including a position information acquiring step of acquiring a current position of an operation support device, and outputting current position information; an inspection information processing step of adding information regarding the operation performed to the facility, and outputting current position information regarding position where the operation was performed to at least the facility that is associated with the historical data to data storage; and an operation supporting step of representing information regarding the operation performed to the facility as operation information based on the historical data, and to enable one or more further functions regarding the operation associated with the operation information to be executed.

According to one aspect of the present invention, the time required to collect information to respond to the trouble of respective facilities installed in the plant can be shortened, and it is able to support the operation for associated with the trouble.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

First Embodiment

Figure 1:
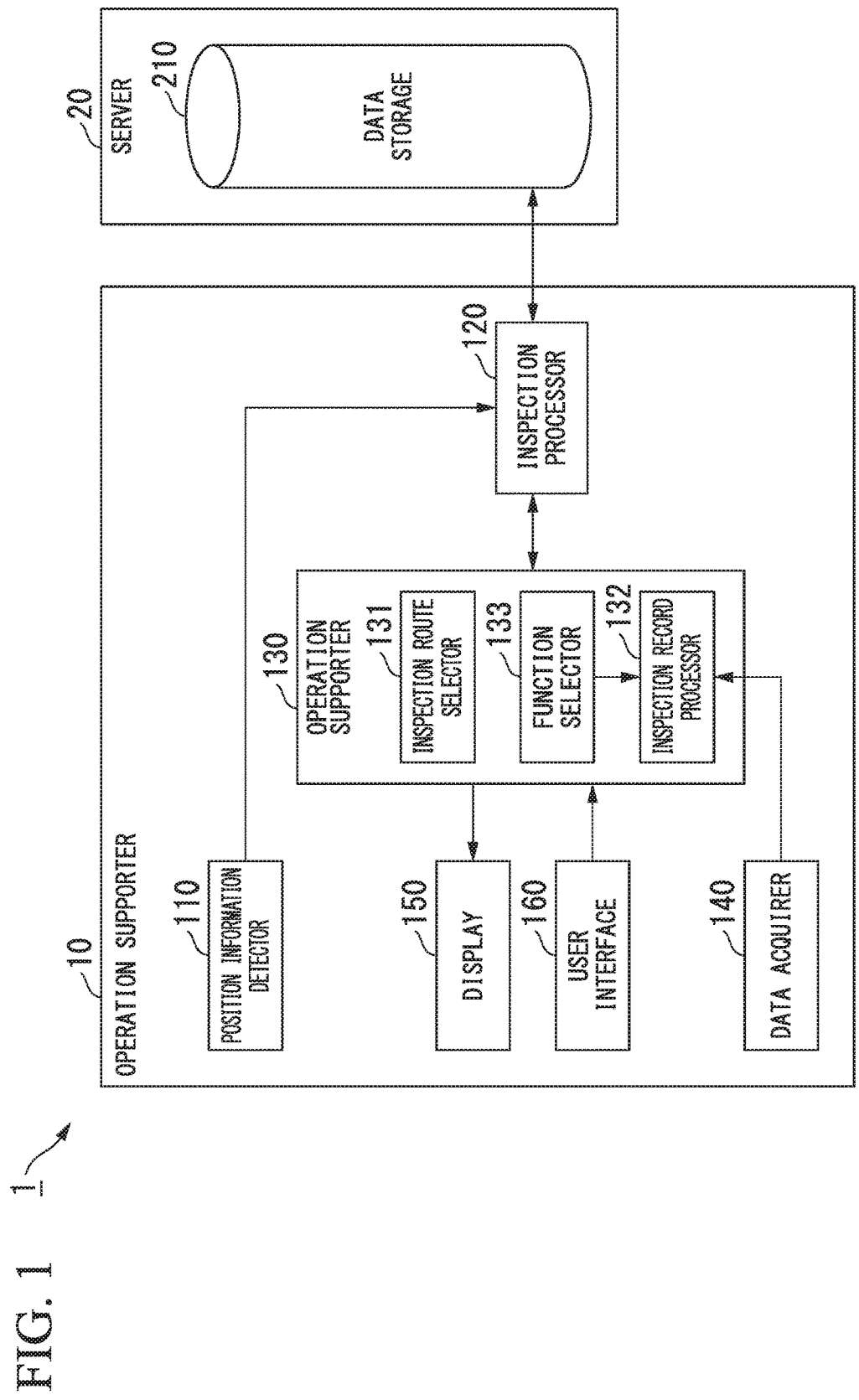
FIG. 1 is a block diagram showing a schematic configuration of an operation support system according to the first embodiment of the present invention.

An embodiments of the present invention will be described with reference made to the drawings. FIG. 1 is a block diagram showing a schematic configuration of the operation support system according to the first embodiment of the present invention. The operation support system 1 is configured to at least an operation supporter 10 and a server 20. The operation support system 1 is a support system which supports the operation of the field operators performing the inspection operation and the trouble-shooting in the facilities installed in the plant.

In the plant, the field operator makes their rounds the plant carrying the operation supporter 10, and performs the inspection operation and the trouble-shooting in each facility. The plant includes industrial plants to produce petroleum refining and chemical products, and plant manages and controls a well-site such as gas fields and oil fields and its surroundings, and plant manages and controls power generation such as hydro, thermal and nuclear power or the like, and plant manages and controls environment power generation such as solar and wind power and plant manages and controls such as water and sewage and dam, or the like.

The operation supporter 10 includes a position information detector (acquirer) 110, an inspection information processor 120, an operation supporter 130, a data acquirer 140, a display 150, and a user interface 160. The server 20 includes a data storage 210. In the operation support system 1, the operation supporter 10 and the server 20 are connected by a wireless communication network constituted in the plant.

In general, a plurality of field operators belongs to a plant. Therefore, each of the field operators respectively moves through the plant, while, carrying the operation supporter 10, and performs a variety of tasks in the inspection target facilities. Thus, the operation support system 1 includes a plurality of operation supporters 10 which respective field operators carry. To simplify the following descriptions, the operation support system 1 includes one operation supporter 10 and the server 20, as shown in FIG. 1.

The operation supporter 10 is a portable terminal device carried by each field operator performing a variety of tasks in the installed facilities in the plant. The operation supporter 10 has a function or functions to support the field operators, for example, presenting a map in the plant, or instructing the field operators to perform operation contents to each of the facilities.

More specifically, the operation supporter 10 includes installation information such as a map in the plant, functions of instructing the field operators to inspection route toward the inspection target facilities. The field operators can easily go to each of the inspection target facilities by moving in accordance with the proposed map and the inspection route using the functions. Moreover, the operation supporter 10 includes a function of representing contents of tasks (hereinafter, referred to as "routine tasks") for the facilities where the field operators arrive to the field operators, in response to the operation by the field operators at the time of arriving at the inspection target facilities. The field operators can easily confirm the operation contents performed in the respective facilities by using the function. The field operators can easily enter the results of the proposed routine operation operating the operation supporter 10. The routine operation includes regular inspection operation performed every day, or every week.

Furthermore, the operation supporter 10 includes function presenting content of the operation (hereinafter, referred to as "atypical the contents of the operation") to the field operators associated with troubles being different from the server 20 and routine operations, in response to the operation by the field operators discovering troubles such as the unexpected abnormality of the facilities. The field operators can easily confirm the atypical operation by the feature. The field operators can appropriately respond to the trouble such as the unexpected abnormality of the facilities as soon as possible by performing the atypical operation presented in the operation supporter 10. The atypical operation also includes operations to events that may be some troubles.

Each of the components of the operation supporter 10 may be provided in a dedicated mobile terminal device to be used in the plant. Further, each of the components of the operation supporter 10 may be provided in a personal computer (PC), and mobile terminal devices such as a tablet including a function of a Personal Digital Assistant (PDA). Furthermore, each of the components of the operation supporter 10 may be provided in the portable communication terminal device such as a smartphone. The portable communication terminal device integrates functions of the cellular phone using the existing mobile communication network to the function of the portable information terminal. In the following description, each of the components of the operation supporter 10 is described as being provided in the mobile communication terminal device.

The position information detector 110 detects (acquires) the current position of the operation supporter 10 for each predetermined time interval. The current position of the operation supporter 10 means, for example, the present position of the field operators with carrying the operation supporter 10. The position information detector 110 detects the present position of the field operators, for example, communicating with the public positioning system using artificial satellites (positioning satellites), such as the GPS satellites transmitting the GPS (Global Positioning System) signal (radio waves). The position information detector 110 may detect the current position of the operation supporter 10 communicating with the device, for example, a position information tag, for detecting the position of the operation supporter 10. The position information detector 110 supplies information (hereinafter, referred to as "current location information") indicating the current position of the detected operation supporter 10 to the inspection information processor 120. The position information detector 110 may transmit the current position information, for example, via the communication device and the wireless communication network (not shown) provided in the operation supporter 10 to the server 20.

The inspection information processor 120 transmits and receives information regarding inspection operations which the field operators carrying the operation supporter 10 perform in the plant to/from the server 20 via the communication device and the wireless communication network (not shown). More specifically, the inspection information processor 120 receives or acquires inspection information, for example, a map data (hereinafter, referred to as "plant map data") in the plant for presenting to the field operators, and data (hereinafter, referred to as "inspection route data") of inspection route including the route information for making their rounds the inspection target facilities and in the plant from the server 20, and supplies the obtained plant map data and the inspection routes data to the operation supporter 130. The inspection information processor 120, for example, receives and acquires information of the routine operation presenting the field operators from the server 20. The inspection information processor 120 supplies the acquired information for routine operation to the operation supporter 130. The inspection information processor 120 transmits and supplies information such as operation result to the server 20. Information received from the field operators and data acquirer 140 received from the operation supporter 130 to the server 20 is associated with the current position information received from the position information detector 110.

The inspection information processor 120 receives and acquires information of the atypical operation from the server 20, for example, in response to a request for atypical operation information received from the operation supporter 130. At this time, the inspection information processor 120 requests historical data (hereinafter, referred to as "inspection history data") to the server 20, and receives or acquires the respective inspection history data transmitted or received from the server 20 in response to the request. The inspection history data is the historical data which records data in the associating operation such as the past inspection history and the past trouble-shooting history operated to the facilities installed at the position indicating the current position information received from the position information detector 110. The inspection information processor 120 receives (acquires) the each inspection history data (each inspection history data associated with the current position information) to the operation supporter 130 as information of the atypical operation. The inspection information processor 120 transmits or supplies information such as the troubleshooting received from the operation supporter 130 in association with the current position information received from the position information detector 110 to the server 20.

The operation supporter 130 performs processing for realizing the respective functions to support the field operators based on the respective data or information received from the inspection information processor 120. More specifically, the operation supporter 130 presents the field operators carrying the operation supporter 10 the path to each of the facilities based on the plant map data and the inspection route data received from the inspection information processor 120. Moreover, the operation supporter 130 supplies the operation results and the like received from the field operators to the inspection information processor 120 as well as presents the operation contents performed by the field operators based on information of the routine operation received from the inspection information processor 120. Moreover, the operation supporter 130 controls the various functions provided in the operation supporter 10 based on atypical operation information received from the inspection information processor 120. Further, the operation supporter 130 controls the various functions provided in the operation supporter 10 to present the operation method for associated with unexpected abnormality of the facilities as well as to support the operation performed by the field operators based on the presented the operation methods. The operation supporter 130 includes an inspection route selector 131, an inspection record processor 132, and a function selector 133.

The inspection route selector 131 indicates a path of making their route in the plant presented by the inspection route data, on the map in the plant presented by plant map data received from the inspection information processor 120. The inspection route selector 131 generates an inspection route map which presents the inspection route of the respective facilities, while the field operators sequentially moving. Then, the inspection route selector 131 generates display image for displaying a created inspection route map on the display 150 and supplies it to the display 150. The inspection route selector 131 may present the current position of the field operators by predetermined symbols or the like, based on the current position information received from the position information detector 110 on the inspection route map.

The inspection record processor 132 generates inspection information such as an inspection list similar to a conventional inspection list presenting the operation contents and the operation method performed by the field operators based on information of the routine operation received from the inspection information processor 120. Then, the inspection record processor 132 generates display image for displaying a created inspection list on the display 150 and supplies it to the display 150. Moreover, the operation supporter 130 gathers the operation results input by the field operators operating and information such as measurement results received from data acquirer 140 and adds the operation results and information of the routine operation, and supplies the same to the inspection information processor 120. Accordingly, the inspection information processor 120 supplies information of the routine operation added the operation results or the measurement results received from the inspection record processor 132 in association with the current position information to the server 20.

The function selector 133 generates a support method list presenting the operation contents and the operation methods of the trouble-shooting which other field operators operated in the past at the position which the other field operators found the unexpected abnormality of the facilities as the support methods for currently discovered problem based on atypical operation information received from the inspection information processor 120. Then, the function selector 133 generates display image for displaying the created support method list on the display 150 and supplies it to the display 150. Then, the operation supporter 130 performs operations in accordance with the support method to the selected trouble in response to the operation of the field operators on the display image of the support method list. The operation support system 1 supports the field operators associated with each trouble by utilizing various functions included in the operation supporter 10. At this time, the function selector 133 makes executable various functions such as starting and switching of various functions included in the operation supporter 10 required to the trouble-shooting. The function selector 133 supplies information of the trouble-shooting method selected by the field operators to the inspection information processor 120. Accordingly, the inspection information processor 120 supplies information such as the trouble-shooting method received from the function selector 133 to the server 20 associated with the current position information.

The data acquirer 140 acquires the measurement result presenting the operating state of the facilities in which the measurement device installed into various facilities in the plant applied to the operation support system 1. The measurement device measures the operating state of the facilities, for example, such as "voltage", "temperature", "flow", "magnetic", and "pressure" or the like, at the position of installed in the facilities. The data acquirer 140, for example, includes a communication device (not shown) for communicating with each of the measurement devices. The communication device communicates with the measurement devices installed in the respective facilities, and acquires the measured result which each measurement device measured. In the present invention, the communication method between the communication device and the measurement device, is not particularly defined whether it is wireless or not. The data acquirer 140 uses the communication device and supplies the measurement result acquired from the measurement devices installed in each of the facilities to the operation supporter 130 (more specifically, the inspection record processor 132).

The display 150 is a display device such as a liquid crystal display (LCD: Liquid Crystal Display). The display 150 displays the field operators carrying the operation supporter 10 a variety of information by displaying an image associated with the display image (images) received from the operation supporter 130.

The user interface 160 is, for example, a user interface such as buttons and switches, and receives an operation to the operation supporter 10 by the field operators. The user interface 160 may not be limited to the configuration including buttons and switches. The user interface 160 may be configured to, for example, a pressure sensor included in the display 150. That is, the user interface 160 may be configured as a touch panel in combination with the display 150. In this case, the user interface 160 detects (acquires) various types of touch operations (such as tapping or flicking) by the field operators, and accepts the detected operation as the operation to the operation supporter 10 by the field operators. Then, the user interface 160 supplies information associated with the accepted operation of the field operators, that is, the operation and the instructions input by the field operators, to the operation supporter 130.

The operation supporter 10 supports the field operators carrying the operation supporter 10 and performs the inspection of each facility while moving in the plant sequentially.

The server 20 communicates with each the operation supporter 10 via the wireless communication network constituted in the plant, transmits data and information to the operation supporter 10 and receives data and information from the operation supporter 10. More specifically, the server 20, for example, transmits or supplies the plant map data, the inspection route data, and information of the routine operation stored in data storage 210 in response to the request from the inspection information processor 120 included in the operation supporter 10, to the operation supporter 10. Further, the server 20, for example, receives information such as the operation results associated with the current position information transmitted from the inspection information processor 120 included in the operation supporter 10, and stores information of the received operation results in data storage 210. Further, the server 20, for example, retrieves inspection history data associated with the current position information from among inspection history data stored in data storage 210 in response to a request from the inspection information processor 120 included in the operation supporter 10, and transmits or supplies, the respective inspection history data associated with the retrieved current position information, to the operation supporter 10. Furthermore, the server 20, for example, receives information such as the trouble-shooting method associated with the current position information received from the inspection information processor 120 included in the operation supporter 10, and stores information of the received trouble-shooting method to data storage 210.

The data storage 210 is a storage device which stores various data and information in the operation support system 1. The data storage 210 stores data and information, for example, such as the plant map data, the inspection route data, the routine operation information, and the inspection history data to provide for the operation supporter 10. Further, data storage 210 stores information such as the operation result, the measurement results, and the trouble-shooting method transmitted from the operation supporter 10, and various data. The data storage 210 includes, for example, a variety of memory such as a flash memory and a storage device such as HDD. Data or information stored in data storage 210 is not limited to data and information described above, but includes various data and information used by the operation supporter 10 in the operation support system 1.

The operation support system 1 supports the field operators inspecting each of the facilities installed in the plant carrying the operation supporter 10, while communicating via the wireless communication network constituted in the plant between the operation supporter 10 and the server 20. The server 20 may be a server device included on the cloud computing system having data on the internet. In this case, the operation support system 1 supports the field operators making their rounds in the plant carrying the operation supporter 10, while the communicating between the operation supporter 10 and the server 20 via the internet.

Next, the operation of the operation support system 1 of the first embodiment will be described. A routine inspection operation performed by the field operators will be described.

The inspection target facilities which the field operators are to operate are installed in a specific location in the plant. Therefore, each field operator, according to the following steps, goes to each inspection target facility installed in the pre-assigned inspection route, and performs a respective operation based on the inspection list. Further, in the following description, the operation supporter 10 may include a touch panel combined with the display 150 and the user interface 160. Furthermore, in the following description, while the operation supporter 10 is activating, the position information detector 110 constantly outputs the current position information.

(Step N1): The field operators start the operation supporter 10, operate the user interface 160, and request the operation supporter 10 to present the inspection route. In the operation requesting the presentation of the inspection route, the field operators input identification information for identifying each of the inspection routes, for example, inspection route number, the name of the inspection routes or the like, to the operation supporter 10, operating the user interface 160. The user interface 160 receives the operations, and supplies the identification information of the received inspection routes to the operation supporter 130. Thus, the inspection route selector 131 in the operation supporter 130 requests the inspection information processor 120 to acquire the inspection route data associated with the identification information of the received inspection route and the plant map data in a range of inspection route. The inspection information processor 120 acquires the requested inspection route data and the plant map data from the server 20, and supplies the same to the inspection route selector 131. Then, the inspection route selector 131 generates the inspection route map based on the inspection route data and the plant map data received from the inspection information processor 120, and generates the display image for displaying the created inspection route map, and supplies the same to the display 150. Thus, the inspection route map which the field operators requested is displayed or presented to the display 150.

Figure 2:
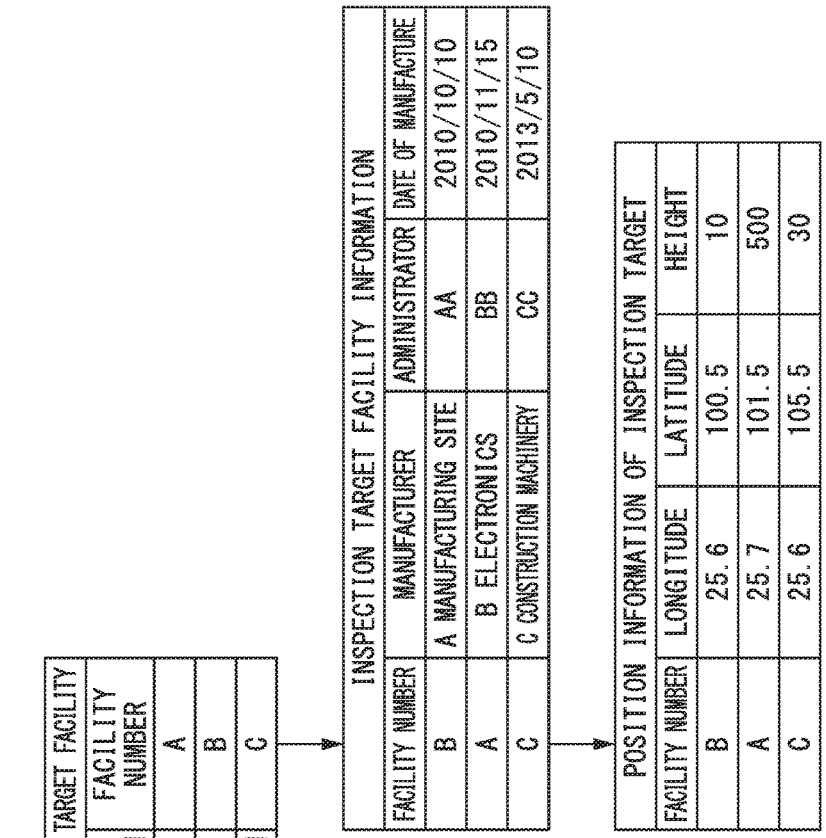
FIG. 2 is a diagram showing an example of the configuration of data used when the operation support device presents an inspection route in the operation support system according to the first embodiment.
Figure 4:
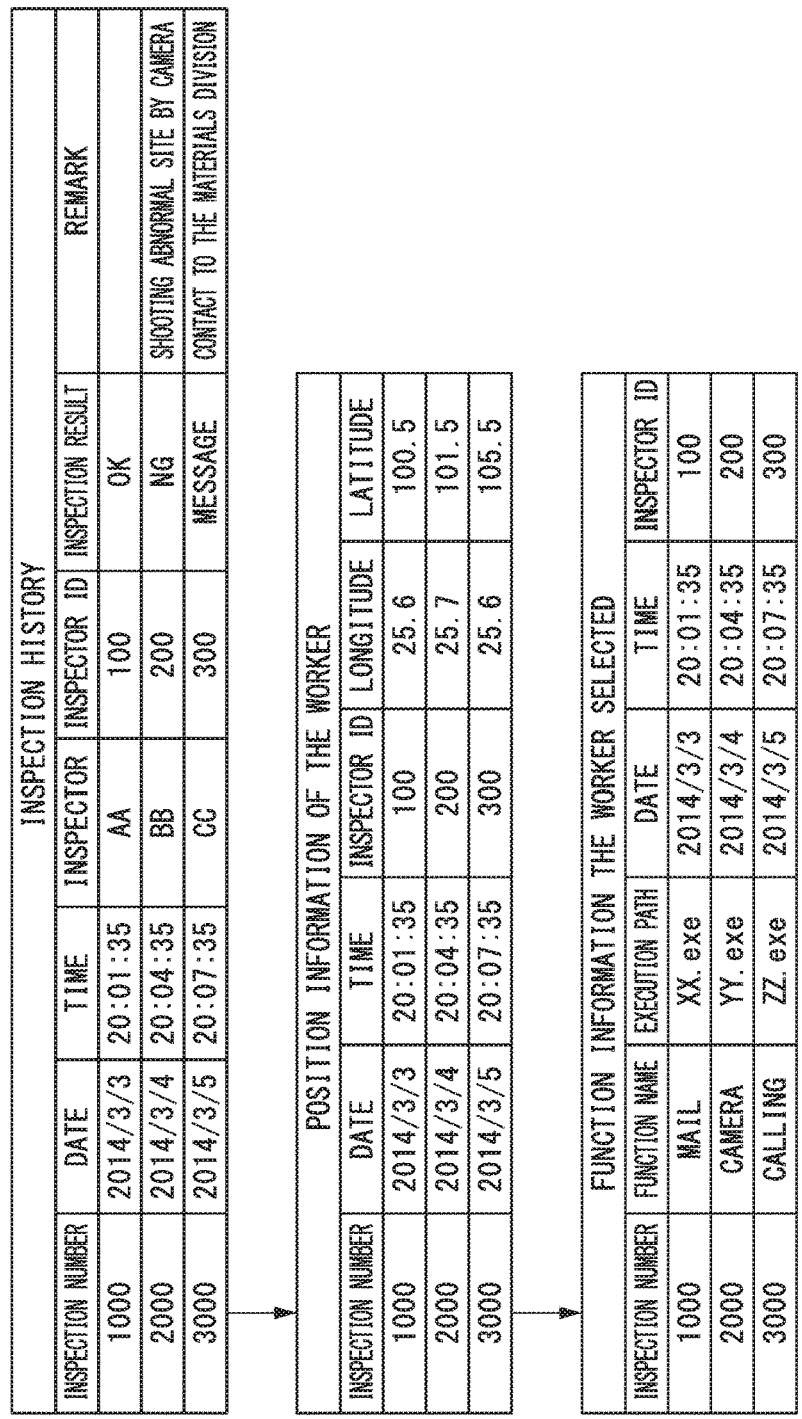
FIG. 4 is a diagram showing an example of a structure of data used when the operation support device presents the support method list in the operation support system according to the first embodiment of the present invention.

Here, the inspection route data to create the inspection route map will be described. In the description, since the plant map data is not particularly provisioned, a detailed description thereof will be omitted. FIG. 2 is a diagram showing an example of the configuration of data used when the operation support device presents an inspection route in the operation support system 1 according to the first embodiment. The inspection route data is for associating the respective inspection route which the field operators make their rounds through the plant and various information regarding the inspection target facilities according to the inspection route. FIG. 2 shows an example of the configuration of the inspection route data. The inspection history data is data for associating the inspection history in each facility and the various information such as the field operator position and the starting function when the field operators discover the unexpected abnormality of the facilities. FIG. 4 shows an example of a configuration of the inspection history data.

The inspection route data shown in FIG. 2 includes "inspection route identification information", as information for identifying the respective inspection route. The "inspection route identification information" includes the respective information, "route number", and the "route name". The "route number" is exclusively assigned to each inspection route. The "route name" is a name presenting the feature of the inspection route so that each inspection route can be identified.

The inspection route data shown in FIG. 2 is configured "identification information of the inspection target facility" as information for identifying the inspection target facilities in the respective inspection route. The identification information of the inspection target facility includes information each of a "route number", a "facility name", a "facility classification", and "facility number". The route number is the same information as the route number in the inspection route identification information. The facility name is a name presenting the feature of the inspection target facilities exclusively granted to identify each facility located within a plant. The facility classification is information which classifies the respective facilities for each function. The inspection route data associates the inspection route identification information with the identification information of the inspection target facilities according to the route number, the associated data represents whether inspection route each of the facilities of the inspection target belongs to. The "identification information of the inspection target facility are associates one facility with a plurality of the route number, such as "facility name"="pump B". The field operators can perform the same inspection operation to the facilities in whichever associated inspection routes. Moreover, the field operators can perform the inspection operation more than the other facilities.

Further, "inspection target facility information" is configured as information of each inspection target facility, in the inspection route data shown in FIG. 2. The "inspection target facility information" includes respective information such as "facility number" "manufacturer", "administrator", and "date of manufacture". The facility number is the same information as the facility number in the identification information of the inspection target facility. The manufacturer is information presenting the manufacturer of the respective facilities. The administrator is information presenting the administrator of each facility. Moreover, the manufacture date is information presenting the date that each facility produced. The inspection route data associates the identification information of the inspection target facility with the inspection target facility information by the facility number, and presents information for managing each of the inspection target facility.

Further, the inspection route data shown in FIG. 2, is set "position information of the inspection target" as information of the position where the respective inspection target facility is installed. The position information of the inspection target includes each information such as "longitude", "latitude", and "height". Here, the longitude is the longitude information presenting the absolute position at which each of the facility is installed. The latitude is latitude information presenting the absolute position at which each of the facility is installed. The height is the height information presenting the absolute position in which each facility is installed. The inspection route data has association of the inspection target facilities information with the position information of the inspection target by the facility information, and presents the position information in which the respective inspection target facilities is installed.

The inspection route selector 131 generates the inspection route map presenting a route which the field operators make their round in the plant on the map in the plant presented by the plant map data by associating a variety of information included in the inspection route data. More specifically, the inspection route selector 131 generates the inspection route map presenting a route to inspect while sequentially moving the facilities contained in each inspection route, for example, by associating the position information in which each of the facility included in the plant map data installed with information of the longitude, the latitude, and the height presented in the position information of the inspection target.

Information, used when the inspection route selector 131 generates the inspection route map, is not limited to the above-described information. For example, if the respective facility information contains information associated with "facility name" of the identification information of the inspection target facility in the inspection route data in the plant map data, the inspection route selection part 131 may create the inspection route map by associating the respective facility name information included in the plant map data with the facility name presented in the identification information of the inspection target facility in the inspection route data. Further, for example, if the respective facility information contains information associated with the facility number in the identification information of the inspection target facility in the inspection route data in the plant map data, the inspection route selector 131 may create the inspection route map by associating the respective facility number information included in the plant map data with the facility number included in the inspection route data.

(Step N2): The field operators go to the respective facilities carrying the operation supporter 10 displayed the inspection route map on the display 150. At this time, as described above, the inspection route selector 131 may display the current position of the field operators on the inspection route map based on the current position which the position information detector 110 supplied.

Figure 3:
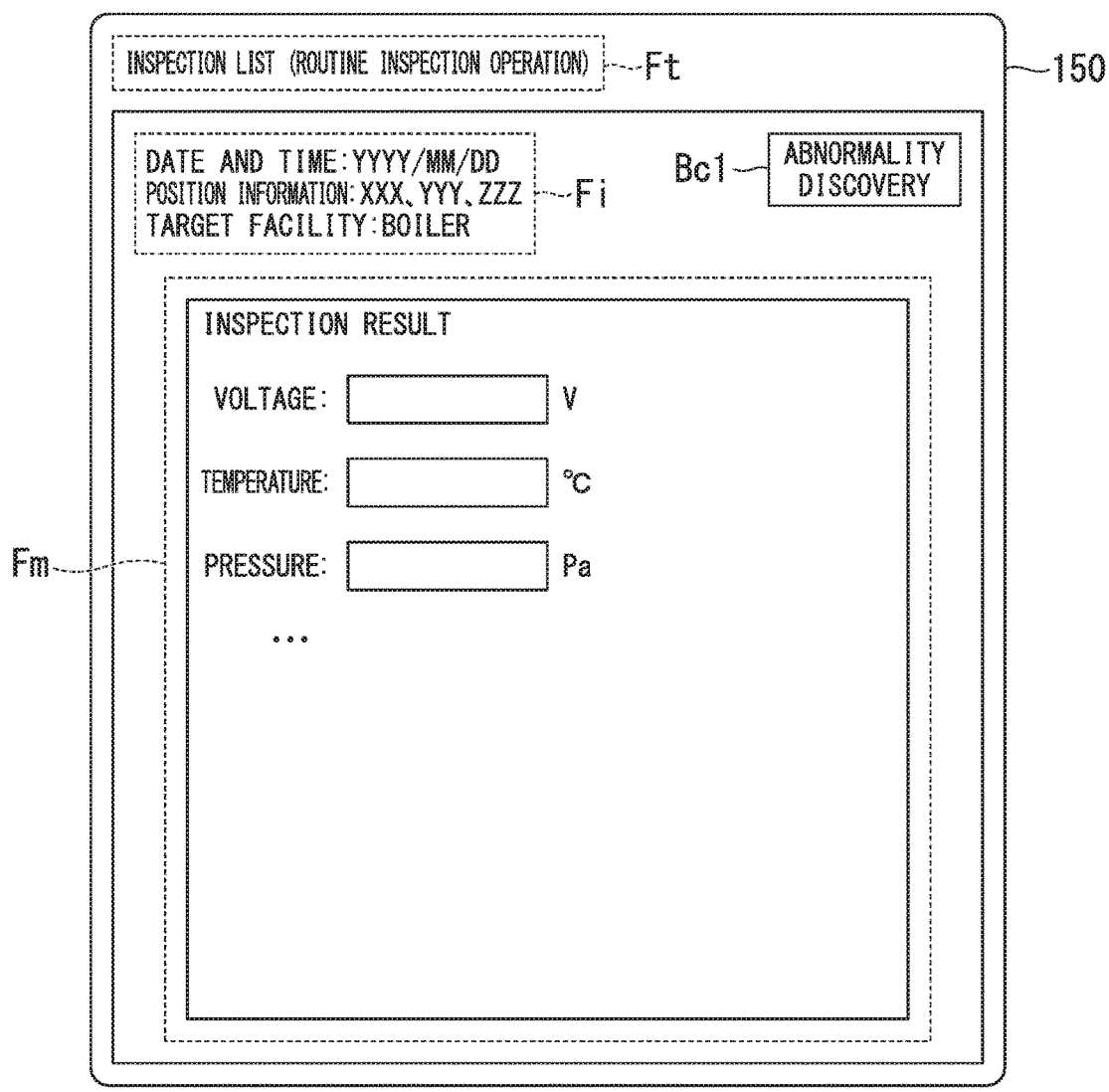
FIG. 3 is a diagram showing an example of an inspection list which the operation support device presents in the operation support system according to the first embodiment of the present invention.

(Step N3): The field operators operate the user interface 160, and request the presentation of the inspection list, when they arrive at the first operation site, that is, the inspection target facilities. The user interface 160 receives the operation described above, and supplies information requesting the presentation of the received inspection list to the operation supporter 130. Accordingly, the inspection record processor 132 in the operation supporter 130 requests acquisition of routine operation information to the inspection information processor 120. The inspection information processor 120 acquires the routine operation information associated with the facilities installed at a position indicated by the current position information from the server 20, and supplies it to the inspection record processor 132. Then, the inspection record processor 132 generates the inspection list based on the routine operation information received from the inspection information processor 120. The inspection record processor 132 generates the display image for displaying the created inspection list. The inspection record processor 132 supplies it to the display 150. Thus, the inspection list which the field operators requested is displayed or presented to the display 150. Here, for example, the display image of the inspection list as shown in FIG. 3 to be described later is displayed on the display 150. In the description, since the configuration of the routine operation information is not particularly provisioned, detailed descriptions thereof will be omitted.

When the field operators request the presentation of the inspection list, the field operators may operate the user interface 160, and input the identification information for identifying each of the inspection target facilities, for example, the facility number and the name of the facilities to the operation supporter 10. At this time, the field operators may input the identification tag information to the operation supporter 10, for example, when the identification information such as an identification tag is assigned to each facility, as device for inputting identification information for identifying the facilities. The facility identification information may be treated in the same manner as the current position information. That is, the user interface 160 receives the operation described above, and supplies the inputted facility identification information as information for requesting the presentation of the inspection list, to the operation supporter 130. Accordingly, the inspection record processor 132 requests the acquisition of the routine operation information associated with the identification information of the inputted facilities to the inspection information processor 120. The inspection information processor 120 acquires the routine operation information associated with the facilities having the requested identification information from the server 20, and supplies it to the inspection record processor 132. Thus, the inspection record processor 132 generates an inspection list based on the routine operation information, and displays or presents the inspection list requested by the field operators to the display 150.

(Step N4): The field operators operate for the facilities based on the operation contents of the presented inspection list displayed on the display, and operate the user interface 160, and input the result of the operation to the operation supporter 10. The user interface 160 receives the operation described above, and supplies the inputted operation result information to the inspection record processor 132. Accordingly, the inspection record processor 132 receives the routine operation information from the inspection information processor 120. The inspection record processor 132 adds the operation result information received from the user interface 160. The inspection record processor 132 supplies the routine operation information adding the operation result information to the inspection information processor 120. The inspection information processor 120 associates the routine operation information, added with the operation result information by the inspection record processor 132, with the current position information. The inspection information processor 120 transits or supplies it to the server 20. The current position information may be the facility identification information which can be handled similarly to the current position information. Thus, the server 20 receives the routine operation added with the operation result information from the operation supporter 10, and stores in data storage 210.

Note that in step N4, if data acquirer 140 including the operation supporter 10 acquires the measurement result communicating with the measurement devices installed in the inspection target facilities of the present position, the inspection record processor 132 may add a measurement result which data acquirer 140 obtains to information of the routine operation, and may supply information to the inspection information processor 120, and stores information in data storage 210.

Here, an example of the inspection list which the operation supporter 10 presents the field operators will be described. FIG. 3 is a diagram showing an example of an inspection list which the operation supporter 10 presents in the operation support system according to the first embodiment of the present invention. FIG. 3 shows an example of a case of displaying a display image of the inspection list which the inspection record processor 132 generates on the display 150. The display image of the inspection list includes a list title display area Ft, a facilities information display area Fi, and an inspection result input area Fm.

The list title display area Ft is an area for informing the field operators the displayed inspected list is whether the atypical operation or a routine task by displaying the title of the inspection list. In the example of the inspection list shown in FIG. 3, the list title display area Ft displays a "routine inspection operation" because the routine inspection operation is, that is, a routine operation.

The facilities information display area Fi is the area where the field operators confirm whether the inspection list meets the current facilities operating the inspection by displaying information of the facilities performing the operation. In one example of the inspection list shown in FIG. 3, the respective information will be described below, a "date and time" for current operation, a "location information" representing the position in which the inspection target facilities are installed, and "target facilities" representing a form of facilities in the current operation.

The inspection result input area Fm is an area for inputting a result of the inspection the field operators performed. In one example of the inspection list shown in FIG. 3, the inspection result input area Fm includes an input area to be entered the inspection results or measurement results inspecting or measuring of the "voltage", "temperature", and "pressure", as an example of an operation content of the inspection operation. The field operators enter the measurement result information associated with the respective items using input devices such as a keypad or a handwriting pad. The inspection result input area Fm includes input areas inputting the inspection result. The field operators input the measurement result information to the respective items of the input areas tapping the inspection result input area Fm.

In addition, the inspection list, as in the example shown in FIG. 3, displays an "abnormality discovery" button Bc1. The "abnormality discovery" button Bc1 is the tapping button to switch the operation performed by the field operators when the field operators find problems such as the unexpected abnormal in the current operating facilities. The field operators tap the "abnormality discovery" button Bc1, and thereby the operation supporter 10 displays the display image of the support method list on the display 150. The detail description regarding the display image of the operation in case that the field operators tap the "abnormality discovery" button Bc1 and the support method list will be described later.

(Step N5): The field operators go to the next inspection target facilities carrying the operation supporter 10. At this time, in a similar way to the Step N2, the field operators go to the respective facilities carrying the operation supporter 10 which the inspection route map is displayed on the display 150.

Hereafter, the field operators repeat the Step N3 to Step N5 until the series of operations described above is finished.

By the procedure described above, in the operation support system 1, each of the field operators go to the respective operation site, that is, the inspection target facilities in accordance with the inspection route displayed on the operation supporter 10. In the respective facilities, the field operators operate respectively based on the inspection list displayed on the operation supporter 10. In other words, the field operators can easily grasp the route making their rounds in the plant in accordance with the displayed inspection route on the operation supporter 10. The field operators can easily grasp the content of the operation performed in the respective facilities in accordance with the displayed inspection route on the operation supporter 10, and can perform the operation.

The field operators may discover problems such an unexpected abnormality of the facilities while operating in the facilities based on the content of operation of the inspection list presented on the operation supporter 10. Further, the field operators may discover problems such an unexpected abnormality of the facilities while making their rounds through the plant according to the inspection route displayed on the operation supporter 10. Furthermore, the facilities discovered problems while making their rounds through the plant may not be the inspection target facilities. Even in such a case, the field operators have to troubleshoot and trouble-report being different from the routine operation.

Next, in the operation support system 1 according to the first embodiment, a description will be provided for the operation when the field operators support to the unexpected abnormality of the facilities. The operation associated with the trouble of the unexpected abnormality of the facilities, the operation transits from the routine inspection operation to the operation supports to the unexpected abnormality of the facilities in every time information indicating that the field operators discovery the unexpected abnormality of the facilities, and returns to the routine operation after operating. The following description will be provided for the case where the field operators discover the unexpected abnormality of the facilities in the inspection target facilities installed on the inspection routes when the field operators perform the operation of Step N4 described above.

(Step U1): If the field operators discover the unexpected abnormality of the facilities, tap a button Bc1, in FIG. 3. The button Bc1 indicates "Abnormality discovery". The button Bc1 is displayed on the display image of the presented inspection list. The user interface 160 received the operation described above supplies information indicating the abnormality discovery button Bc1 is selected to the operation supporter 130. Accordingly, the function selector 133 included in the operation supporter 130 requests the acquisition of the non-routine operation information associated with the current facilities to the inspection information processor 120. The inspection information processor 120 acquires atypical operation information associated with the facilities installed at the position indicated as the current position information from the server 20, and supplies atypical operation information to the function selector 133. The current position information may be the identification information of the facilities which can be handled in the same manner with the current position information. The function selector 133 generates the support method list based on atypical operation information received from the inspection information processor 120, and generates the display image for displaying the support method list, and supplies it to the display 150. Atypical operation information may be a set of inspection history data respectively associated with the facilities at the current position. Thus, the support method list which the field operators requested is displayed or presented on the display 150.

Atypical operation information to create the support method list, that is, the inspection history data will now be described herein. FIG. 4 is a diagram showing an example of a structure of data used when the operation supporter 10 presents the support method list in the operation support system 11 according to the first embodiment of the present invention. The inspection history data is data for associating the inspection history in each facility and the various information such as the field operator position and the starting function when the field operators discover the unexpected abnormality of the facilities. FIG. 4 shows an example of a configuration of the inspection history data.

The inspection history is set to the inspection history data shown in FIG. 4 as the inspection history information. The inspection history may include the inspection number, the date, the time, the inspector, the inspector ID, the inspection result, and the remarks. The inspection number is the number assigned exclusively to each of the inspection operation which the field operators performed. The date represents a date in which each of the inspection operations performed. The time is information indicating the time of performing the respective inspection operation. The inspector is the name of the field operators or the inspectors performed the respective inspection operation. The inspector ID is the ID or the number assigned exclusively to each of the field operators or the inspectors. The inspection result is information representing the results or the operation results in each of the inspection operation. The remarks represent the remarks regarding each inspection operation, and is recorded the support method information which the field operators selected to accommodate the unexpected abnormality of the facilities.

Further, the position information of the field operators are set in the inspection history data shown in FIG. 4, as the position information of the field operators who discovered the unexpected abnormality of the facilities. The position information of the field operators includes each of the inspection number, the date, the time, the inspector number, the longitude, and the latitude. Each of the inspection number, the date, the time, and the inspector number is same as each of the inspection number, the date, the time, the inspector number in the inspection history. The longitude and the latitude are information of the longitude and the latitude representing the absolute position when the field operators support to the unexpected abnormality of the facilities.

The field operators selected function information is set in the inspection history data shown in FIG. 4, as information of the support method chosen by the field operators having been found the unexpected abnormality of the facilities. The functional information the field operators having been selected includes the inspection number, the function name, the execution path, the date, the time, and the inspector ID. Each of the inspection number, the date, the time, and the inspector ID, is the same information of the inspection history thereof. Further, the field operators select the function name from among the support method included in the presented support method list. The support method list includes a plurality of the support method associated with the function name, the operation supporter 10 executes according to the support method associated with the function name the field operators selected. An execution path is an execution path to execute the function according to the support method by which the field operators have selected. That is, the execution path is information representing the storage location of the executable file such as software for implementing the selected function.

The inspection history data manages to associate "inspection history", "position information of the field operators", and "field operators selected function information" by "inspection number", and manages information regarding the support method with the unexpected abnormality of the facilities by the "inspection number".

In this way, in the inspection history data, the inspection history in each of the facility, the position of the field operators, and the function to execute or the like, a variety of information described above are associated each other. The function selector 133 determines the position of the unexpected abnormality of the facilities, and generates the support method list associated with each of the facility arranged around the determined positions, based on the position information of the field operators in the inspection history data. More specifically, the function selector 133 compares the longitude and the latitude in the position information of the field operators in the inspection history data with, for example, the position information where each of the facility included the plant map data is arranged. Thereby, the function selector 133 determines that the plant arranged at the position closer to the longitude and the latitude included in the location information of the field operators, is the facilities the unexpected abnormality of the facilities is found. As described in step U1, when the field operators perform the inspection operation, they find the unexpected abnormality of the facilities, tap the abnormality discovery button Bc1 displayed on the display indicating the inspection list, and requests the presentation of the support method list, since it has already known the position of the facilities, the function selector 133 need not to perform the judgment processing of the position of the facilities based on the position information of the field operators in the inspection history data. The function selector 133 generates and presents the support method list associated with the determined facilities.

Figure 5:
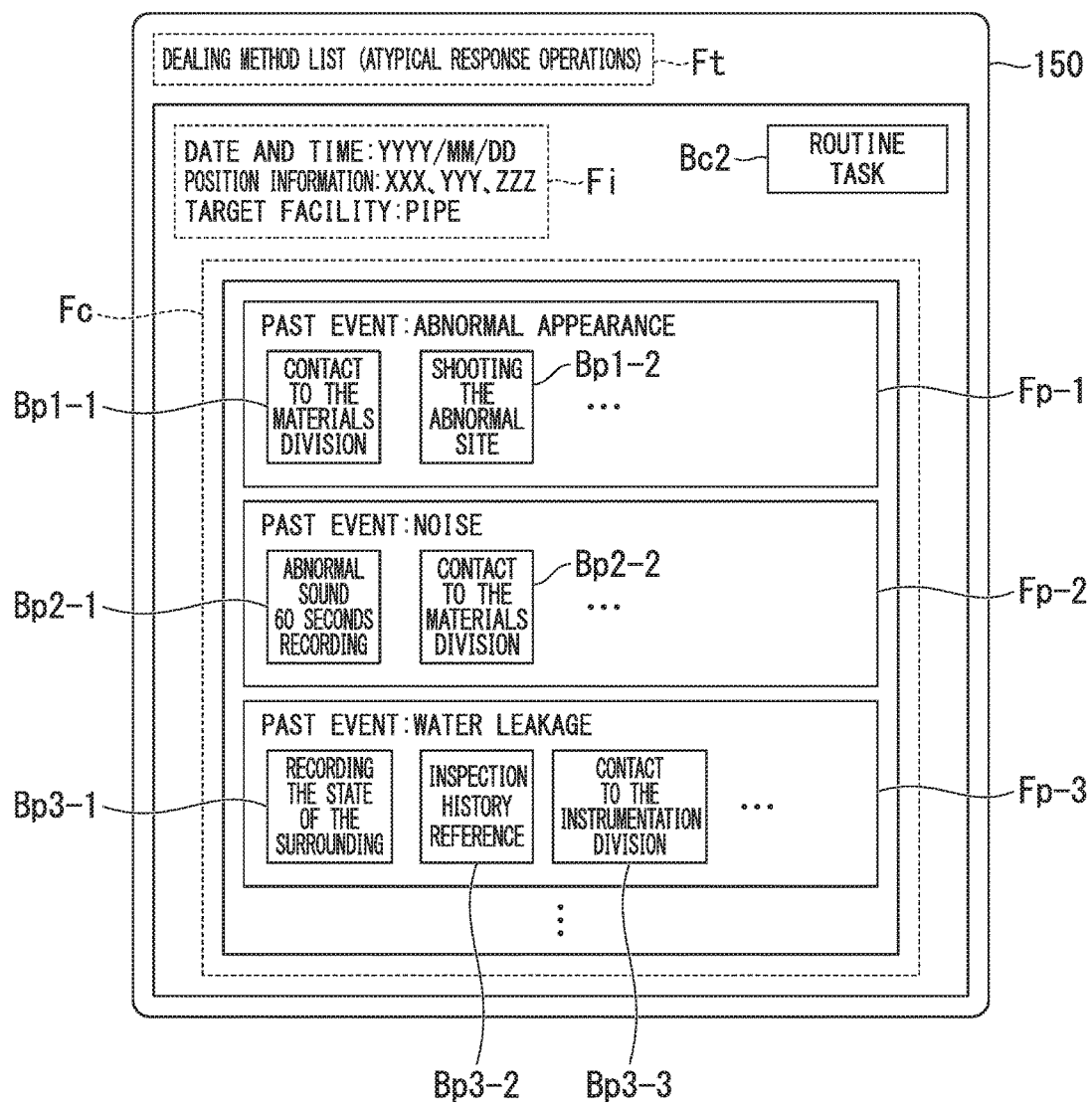
FIG. 5 is a diagram showing an example of a support method list which the operation support device presents in the operation support system according to the first embodiment of the present invention.

An example of support method list which the operation supporter 10 presents to the field operators will now be described. FIG. 5 is a diagram showing an example of the support method list which the operation supporter 10 presents in the operation support system 1 according to the first embodiment. FIG. 5 shows an example of displaying a display image of the support method list generated by the function selector 133 to the display 150. The display image of the support method list includes the list title display area Ft, and facilities information display area Fi, and support method display area Fc.

The list title display area Ft is the area for informing the field operators whether the displayed support method list is the routine operation or the atypical operation by displaying the subject or the title of the support method list, as well as the example of the inspection list shown in FIG. 3. In the example of the support method list shown in FIG. 5, the list title display area Ft displays "atypical response operations", because the operation associated with the trouble is the atypical operation.

The facilities information display area Fi is an area for displaying information of the facilities performing the operation in order to have the field operators confirm whether the facilities displayed on the support method list are the facilities to perform the current operation, as well as the example of the inspection list shown in FIG. 3. Each information displayed on the facilities information display area Fi is similar to the example of the inspection list shown in FIG. 3.

The support method display area Fc is the area in which the trouble-shooting the other field operators performed in the past at the current position. That is, it is the area to display such as each of information of the inspection history data inputted as atypical operation information. The support method display area Fc displays each of the support method, being grouped by each event of the same trouble in the past. In the support method display area Fc, if the other field operators performed a plurality of the support method for the same event in the past, that is, if there are a plurality of the inspection history data associated with the same event, each of the support method, that is, the inspection history data, is rearranged and displayed in the support method display area Fc in accordance with a predetermined condition. The conditions to rearrangement of each of the support method may be considered a variety of conditions. For example, the date and the time is rearranged from the newest, in other words, it is considered that the support method having been selected in the previous trouble-shooting considered to be displayed on the top. Further, for example, it is considered rearranging in descending order of the number selected by the other field operators, that is, the support method many field operators selected in the past is displayed on the top. The example of the support method list shown in FIG. 5 shows three events as the trouble event in the past. It also shows a plurality of support methods the other field operators performed, with the form of the buttons for the field operators selecting and operating the user interface 160, in the past events display area Fp such as the past events display area Fp-1 to the past events display area Fp-3 associated with the respective events. Note that in the example of the support method list shown in FIG. 5, an example of displaying a plurality of support methods associated with each of the past event in descending order on the ranking of the times selected by the other field operators.

More specifically, the past events display area Fp-1 indicates a first past event which the event of the trouble is the abnormal appearance. The past events display area Fp-1 indicates a "contact to the material division" button Bp1-1 for a "contact to material division", and a "shooting an abnormal site" button Bp1-2 for a "shooting an abnormal part", as a support method which the other field operators performed for the event of the abnormal appearance in the past. When the field operators operate the user interface 160, select one of the buttons Bp1, the function selector 133 activates the function associated with the support method of the selected button Bp1 among the functions provided in the operation supporter 10. For example, if the field operators select the "contact to the material division" button Bp1-1, the function selector 133 activates the mobile phone function provided in the operation supporter 10, and supports the field operators calling the materials division staff. Further, for example, if the shooting an abnormal site button Bp1-2 is selected by the field operators, the function selector 133 activates a still-image-photographing function such as the camera provided in the operation supporter 10, and supports the field operators shooting of an abnormal site.

In addition, the past events display area Fp-2 indicates a second past event which the event of the trouble is the abnormal noise. The past events display area Fp-2 indicates an "abnormal sound 60 seconds recording" button Bp2-1 for "recording the abnormal noise for 60 seconds", and a "contact to the material division" button Bp2-2 for a "contact to the materials division", as the support method which the other field operators performed for the event of the abnormal noise in the past. When the field operators select one of the buttons Bp2, function selector 133 activates the function associated with the support method of the selected button Bp2. For example, when the field operators select the abnormal sound 60 seconds recording" button Bp2-1, the function selector 133 activates the recording function provided in the operation supporter 10, that is, the microphone, supports the field operators recording the abnormal noise. Further, for example, if the field operators select the contact to the material division button Bp2-2, the function selector 133 activates the mobile phone function provided in the operation supporter 10 as same as the case where the contact to the materials division button Bp1-1 in the past events display area Fp-1 selected.

In addition, the past events display area Fp-3 indicates the third past events which events of trouble is a water leakage, which has a recording the state of the surrounding button Bp3-1, an inspection history reference button Bp3-2, and a contact to the instrumentation division button Bp3-3. As a method which other field operators performed for the events of the water leak in the past, there are the recording the state of the surroundings, and the reference inspection history, and the contact to the instrumentation division, and they are respectively associated with the recording the state of the surrounding button Bp3-1, the inspection history reference button Bp3-2, and the contact to the instrumentation division button Bp3-3. When the field operators select one of the buttons Bp3, the function selector 133 activates the function associated with the selected one of the buttons Bp3. For example, if the recording the state of the surrounding button Bp3-1 is selected by the field operators, the function selector 133 activates the recording function of the video included in the operation supporter 10, that is, the camera, and supports the shooting of an abnormal site by the field operators. Further, for example, in the case where the inspection history reference button Bp3-2 is selected by the field operators, the function selector 133 displays data of the past inspection operation such as the inspection history included in the inspection history data associated with the event of the water leakage on the display 150, supports the reading of the inspection history by the field operators. At this time, the function selector 133 may activate the communication function provided in the operation supporter 10. Thereby, the function selector 133, for example, may acquire even more inspection history data stored in data storage 210, may display more past inspection history on the display 150. Furthermore, for example, if the contact to the instrumentation division button Bp3-3 is selected by the field operators, the function selector 133 activates the mobile phone function provided in the operation supporter 10, as same as in the case where the contact to the materials division button Bp1-1 provided in the past events display area Fp-1, supports the calling with the field operators with the staff of the instrumentation division.

In addition, a "routine operation" button Bc2 is displaying in the support method list, as in the example shown in FIG. 5. The routine operation button Bc2 is a button to tap in order to switch the operation that field operators perform to the routine inspection operation or the routine operation in the facilities which the current operation is performing. The operation supporter 10 displays the display 150 the display image of the inspection list, by the field operators tapping the routine operation button Bc2, as shown in FIG. 3.

(Step U2): the field operators search the event associated with the current trouble from the displayed support method list regarding the past troubles, determine or select the support method to be performed this time from the support method performed to the event of the same trouble in the past. Then, the field operators operate the user interface 160 inputs the selected support method to the operation supporter 10. The user interface 160 receives this operation, supplies the inputted information of the support method to the function selector 133. Thus, the function selector 133 activates the function associated with the selected information of the support method among the functions provided in the operation supporter 10.

(Step U3): the field operators use the function of the activated operation supporter 10, perform the operation associated with the troubles. Further, the function selector 133 adds the selected support method information to atypical operation information received from the inspection information processor 120. Then, the function selector 133 supplies atypical operation information added the support method information, that is, the inspection history data, to the inspection information processor 120. The inspection information processor 120, an identification information of the facilities that can handle the current location information to inspection history data information has been added for the selected support method (as with the current position information by the function selector 133 associate may also), and transmits (supplies) to server 20. The server 20 adds the inspection history data added the selected support method information transmitted from the operation supporter 10 to data storage 210, and stores in data storage 210.

In step U3, the field operators operate the user interface 160, may input the result of the performed operation to the operation supporter 10. In this case, the user interface 160 which receives an operation by the field operators supplies the inputted operation information to the function selector 133. The function selector 133 adds the operation result information received from the user interface 160 to the inspection history data added the selected support method information, and may supply it to the inspection information processor 120. Thus, the inspection information processor 120 associates the current position information with the inspection history data received from the function selector 133, sends or supplies it to the server 20. The server 20 can store the inspection history data transmitted from the operation supporter 10 to data storage 210.

Thereafter, the operation of trouble-shooting by the field operators is completed, and thereby the operation goes back to the original operation, that is, the operating Step N4 described above.

In such steps operation, the operation support system 1, displays the support method list which the other workers performed in the past at the same position to the operation supporter 10, every time each of the field operators discovers the troubles such as the unexpected abnormality of the facilities. Thus, the field operators grasp the past support method by the support method list displayed on the operation supporter 10, and can perform the operation that supports to the current discovered trouble in the same support method as the past support method.

As mentioned above, the operation support system 1 according to the first embodiment, presents the support method list representing the past support method for supporting the facilities installed around the current position of the field operators, when the field operators found the troubles such as the unexpected abnormality of the facilities. Thus, The plant field operators applied the operation support system 1 according to the first embodiment, can shorten the time required for searching the materials in order to support to the problems such as in the offices. The field operators can determine the support method in order to support to the found troubles of the facilities, to the same support method as the support method in the past. Thus, in the plant applied the operation support system 1 according to the first embodiment, it is possible to quickly support to the trouble of the facilities, can support to the trouble of the facilities in similar quality with the previous performance.

Moreover, the operation support system 1 according to the first embodiment, selects the support method required for associated with the trouble in the presented support method list by selecting the button indicating the support method, activates the required function associated with the selected support method, and supports the operation of the field operators associated with the found trouble. Thus, the plant workers applied the operation support system according to the first embodiment, can avoid that the field operators support to the trouble in the wrong support method. Thus, in the plant applied the operation support plant system 1 according to the first embodiment, even when a trouble is found in the facilities, the field operators can deal the trouble with the appropriate support method.

In the above noted description, in the case that the field operators find the unexpected abnormality of the facilities when the field operators perform the operation of steps N4 in the inspection target facilities in the inspection route, the field operators display the support method list tapping the abnormality discovery button Bc1 indicated in the inspection list. However, a method of displaying the support method list from the inspection list when the field operators operate in the inspection target facilities, is not intended to be limited to the method of tapping the abnormality discovery button Bc1. For example, when the field operators operate in the inspection target facilities, for example, the field operators may display the support method list tapping 2 times in one of the regions in the inspection list, which is, performing a tap operation.

Further, as described above, the unexpected abnormality of the facilities may be found by the field operators making their rounds in the plant. In this case, the field operators, for example, may supply the fact that the field operators found the unexpected abnormality of the facilities and information representing the location of the facility, to the function selector 133 via the user interface 160, in accordance with tapping the current position represented on the map of the inspection route indicated on the display 150 of the operation supporter 10. Thus, the operation supporter 10 can display the support method list associated with each of the facility arranged around the current position, similar to the step U1 described above. However, a method of requesting the displaying the support method list associated with the facilities the field operators found the problem, that is, a method of supplying, the fact that the unexpected abnormality of the facilities found and information representing the position of the facilities to the function selector 133, may be considered a various methods, except for the method of tapping the "abnormality discovery" button Bc1 displayed in the above-noted inspection list, and a method of tapping the current position displayed on the inspection route map.

In the above description, the support method list was shown as shown in FIG. 5, as an example of the support method list which the function selector 133 generates and presents to the field operators. More specifically, FIG. 5 shows the support method list representing a plurality of support method which the field operators can select in each the respective event of the trouble. However, the function selector 133 generates the support method list, presents to the field operators. Then, the support method list is not intended to be limited to the support method list format as shown in FIG. 5.

<Modification of the Display Image of the Support Method List>

Figure 6:
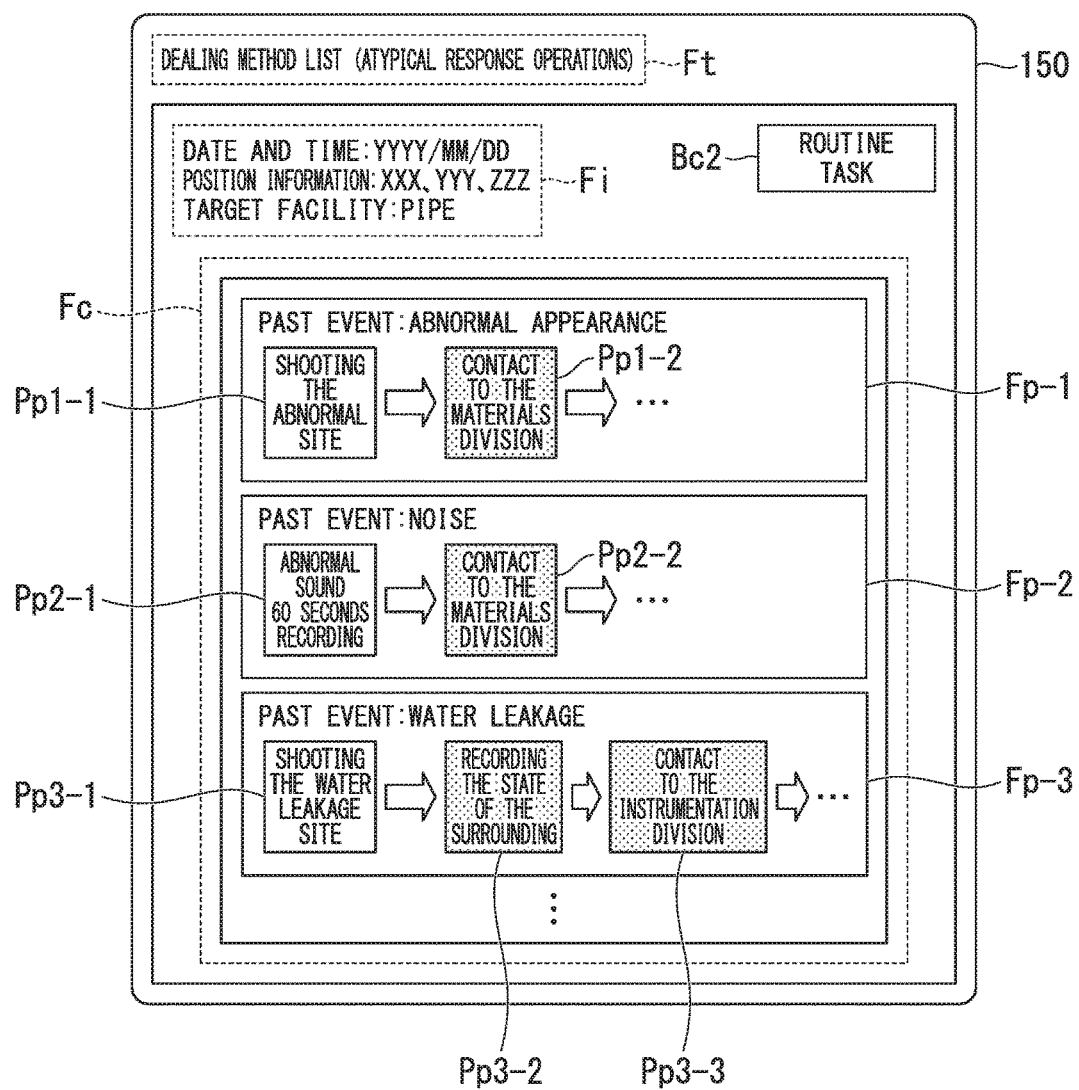
FIG. 6 is a diagram showing another example of a support method list which the operation support device presents in the operation support system according to the first embodiment of the present invention.

Next, another example of the support method list which the function selector 133 generates and presents to the field operators, will be described. FIG. 6 is a diagram showing an another example of the support method list which the operation supporter 10 presents in the operation support system 1 according to the first embodiment of the present invention. FIG. 6 shows another example of a case that the function selector 133 generates a display image of the support method list and displays the display image on the display 150. The display image of the support method list shown in FIG. 6, includes a list title display area Ft, a facilities information display area Fi, and a support method display area Fc, as same as the display image of the support method list shown in FIG. 5. Further, the display image of the support method list shown in FIG. 6 indicates the routine operation button Bc2, as same as the display image of the support method list shown in FIG. 5. A display image of the support method list shown in FIG. 6 is different from the display image of the support method list shown as in FIG.

5, only in the display of the support method display area Fc. Accordingly, in the display area of the display image of the support method list shown in FIG. 6, detailed description regarding the display contents same display area as the display area of the display image of the support method list shown in FIG. 5 will be omitted.

The support method display area Fc, is an area displaying the support method for the troubles which the other field operators performed in the current position in the past which are information of each of the inspection history data, gathered in each event of the same trouble in the past, as well as an example of the support method list shown in FIG. 5. However, in the support method display area Fc of the support method list shown in FIG. 6, the respective operations performed when supporting the trouble, are arranged in order to perform the operation. In an example of the support method list shown in FIG. 6, three events are shown as the events in the trouble in the past. These events display the respective operations performed in sequence in the button form in the past events in the display area Fp which are the past events display area Fp-1 to the past events display area Fp-3, associated with the respective events. Then, in one example of the support method list shown in FIG. 6, though the buttons are displayed on the display area, the field operators can select only the button which is able to implement the support method for the current problem. More specifically, in the example of the support method list shown in FIG. 6, the field operators can select only the button of the first operation by operating the user interface 160. The field operators cannot select the button associated with the operation performing after the first operation. In other words, in the example of the support method list shown in FIG. 6, the field operators select the button in sequence of each of the operation. That is, in the example of the shown in FIG. 6, the support method list sequentially induces the field operators to the respective operation. Thus, the field operators can perform the series of operations associated with the trouble in proper order, sequentially selecting the buttons of the respective operations that are displayed so as to be able to choose.

More specifically, the past events display area Fp-1 indicates the support method associated with the event of the abnormal appearance. The past events display area Fp-1 indicates that the operation performed in the order of the shooting abnormal site, and the contact to the Material division, in order to support to the event of the abnormal appearance. Then, in the past events display area Fp-1, the field operators can select the shooting an abnormal site button Pp1-1 which is to perform at first. And then, the field operators cannot select the contact to the material division button Pp1-2 which is to be performed thereafter. Therefore, the field operators initially select the shooting an abnormal site button Pp1-1 when associated with the event of the abnormal appearance. The function selector 133 activates the still-image-photographing function provided in the operation supporter 10, and support the shooting abnormal site by the field operators. After that, when the operation of the shooting abnormal site is completed, the field operators select the contact to the material division button Pp1-2. The function selector 133 activates the mobile phone function provided in the operation supporter 10, and support calling between the field operators and the staff of the Material division.

Further, the past events display area Fp-2 indicates the support method associated with the event of the abnormal sound. The past events display area Fp-2 displays a plurality of buttons which indicates the field operators performing the operation in the order of the abnormal sound 60 seconds recording, and the contact to the Material division, in order to support to the event of the abnormal sound. Then, in the past events display area Fp-1, the field operators can initially select the abnormal sound 60 seconds recording button Pp2-1, and the field operators cannot select the contact to the material division button Pp2-2. Therefore, the field operators initially select the abnormal sound 60 seconds recording button Pp2-1 when associated with the event of the abnormal noise. The function selector 133 activates the recording function provided in the operation supporter 10, support recording the abnormal noise by the field operators. After that, when the operation of the abnormal sound 60 seconds recording is completed, the field operators select the contact to the material division button Pp2-2. The function selector 133 activates the mobile phone function provided in the operation supporter 10, support calling between the field operators and the staff of the Material division.

Further, the past events display area Fp-3 indicates the support method associated with the event of the water leakage. The past events display area Fp-3 indicates that the operation performed in the order of the shooting the water leakage site, the recording the state of the surrounding, and the contact to instrumentation division, in order to support to the event of the water leakage. Then, in the past events display area Fp-1, the field operators can select the shooting a water leak site button Pp3-1 which is to perform at first. And then, the field operators cannot select the recording the state of the surrounding button Pp3-2 and the contact to instrumentation division button Pp3-3 which is to be performed thereafter. Therefore, the field operators initially select the shooting a water leak site button Pp3-1 when associated with the event of the water leakage. The function selector 133 activates the still-image-photographing function provided in the operation supporter 10, support the shooting abnormal site by the field operators. After that, when the operation of the shooting the water leakage site is completed, the field operators select the recording the state of the surrounding button Pp3-2. The function selector 133 activates the recording function of the video provided in the operation supporter 10, support the shooting abnormal site by the field operators. Furthermore, when the field operators complete the recording the state of the surroundings, the field operators select the contact to instrumentation division button Pp3-3. And then, the function selector 133 activates the mobile phone function provided in the operation supporter 10, and supports the calling between the field operators and the staff of the instrumentation division.

As described above, in the display image of the support method list shown in FIG. 6, as the support method associated with the event of the respective problems, the field operators select the button in sequence of each of the operation and the support method list sequentially induce the field operators to the respective operation. Thus, the field operators can perform the series of operations associated with the trouble in proper order, sequentially selecting the buttons of the respective operations that are displayed so as to be able to choose. Accordingly, the field operators can perform the operation to address the problems such as the unexpected abnormality of the facilities in the proper order, the field operators can avoid associated with the trouble in the wrong order. The aspect of displaying the button associated with each operation (inducing the operation in order) in the support method display area Fc may be any aspects. For example, the color of the button which the field operators can select and the color of the button which the field operators cannot select may be in difference. The order of the operations to be performed, for example, is pre-associated with the support method of the inspection history data.

In the above description, the case that the field operators support to the trouble while the field operators sequentially selecting each operation button of which are shown on the display image of the support method list shown in FIG. 6, is described. Then, in the above description, the configuration of which the function selector 133 activates each of the functions provided in the operation supporter 10 according to the selected operation button. However, the operation which activates each of the function provided in the function selector 133 of the operation supporter 10 is not limited to the operation described above. For example, the field operators can select only the button that indicates the operation to be performed. The function selection unit 133 sequentially activates the functions required when performing a series of operations in each of the support method. In other words, when the operation is completed using the function of the previous activation, the function selection unit 133 activates the following functions required to support to the following operation, can induce the field operators to the operation in order. In this configuration, the field operators can smoothly perform a series of operations in each of the support method for associated with the trouble.

In the operation support system 1 of the first embodiment, the case regarding to generate and present the support method list in accordance with the operation of the field operators, that is, in accordance with request from the field operators was described (see Step U1). However, for example, when the field operators are determined whether or not the field operators discover the unexpected abnormality of the facilities, and the field operators are determined that the field operators discover the trouble of the facilities, based on an actions of the field operators, the operation support system 1 may be configured to generate and present the support method list associated with the facilities installed around the position of the current field operators.

Second Embodiment

Figure 7:
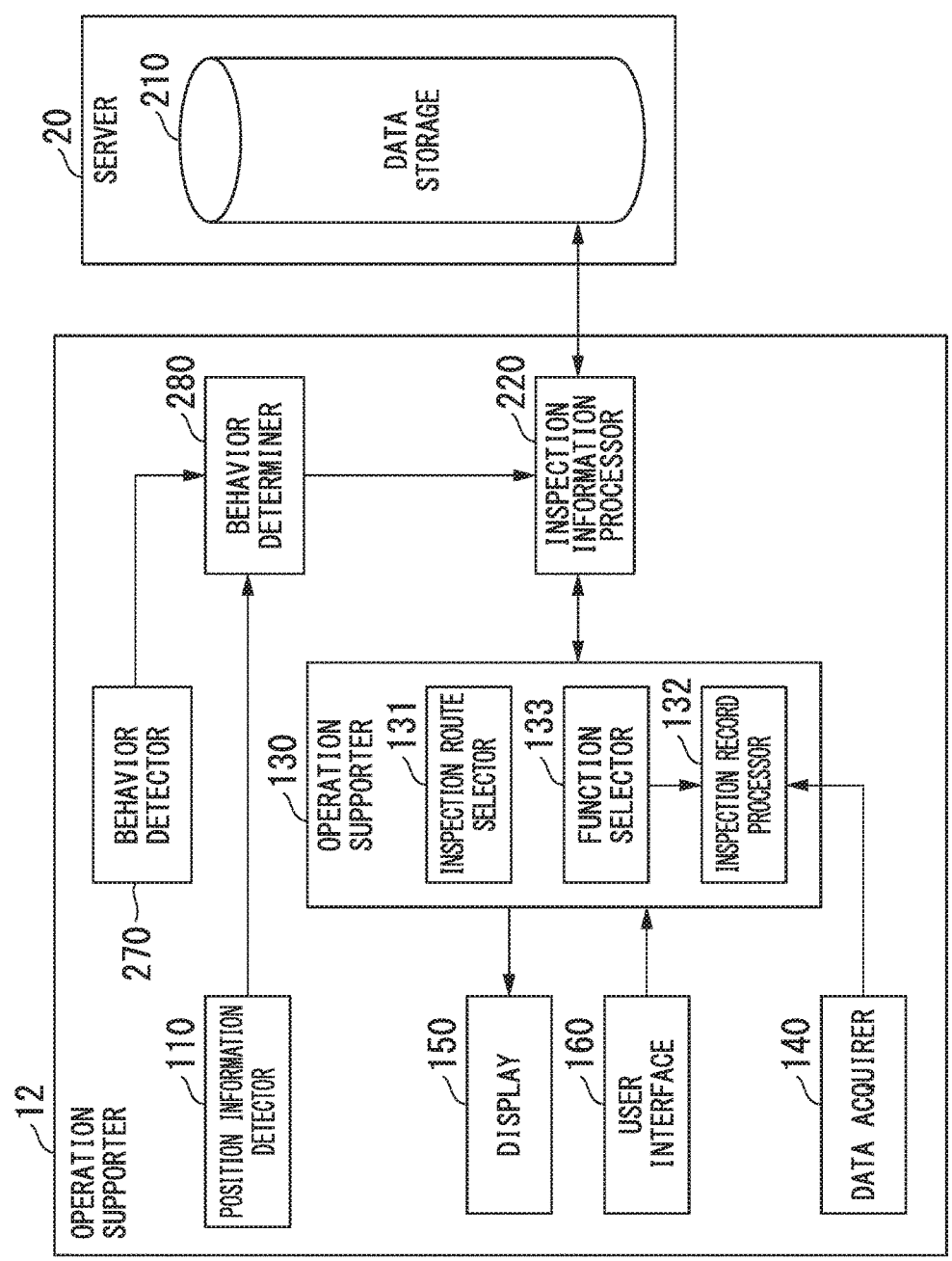
FIG. 7 is a block diagram showing a schematic configuration of an operation support system according to the second embodiment of the present invention.

Next, the second embodiment of the present invention will be described. FIG. 7 is a block diagram showing a schematic configuration of the operation support system according to the second embodiment of the present invention. The operation support system 2 includes at least one operation supporter 12 and the server 20. The operation support system 2 of the second embodiment is the support system configured to support the operation of the field operators performing the inspection operation and the trouble-shooting in the facilities installed in the plant, similar to the operation support system 1 of the first embodiment.

In the operation support system 2, the operation supporter 12 and the server 20 are connected in a wireless communication network constituted in the plant. The field operators make their rounds in the plant carrying the operation supporter 12 in the plant, and operate the inspection operation and the trouble-shooting in each of the facilities. The operation support system 2 includes a plurality of operation supporter 12 which each of the field operators carries, similarly to the operation support system 1 of the first embodiment, also in the following description, in order to facilitate the describing, the operation support system 2, as shown in FIG. 7, includes one operation supporter 12 and the server 20, similar to the operation support system 1 of the first embodiment.

The operation support system 2 shown in FIG. 7, includes the operation supporter 12 instead of the operation supporter 10 included in the operation support system 1 of the first embodiment shown in FIG. 1. That is, the server 20 included in the operation support system 2 is same as the server 20 included in the operation support system 1 of the first embodiment. Therefore, in the following description, detailed description of the server 20 is omitted.

The operation supporter 12 includes the position information detector 110, the inspection information processor 220, the operation supporter 130, data acquirer 140, the display 150, the user interface 160, a supporter behavior acquirer 270 (which is also referred to as a supporter behavior acquirer 270), and an operator behavior determiner 280. The operation supporter 12 includes the inspection information processor 220 provided in the operation supporter 10 of the operation support system 1 according to the first embodiment, instead of the inspection information processor 120, and the operation supporter 12 further includes the supporter behavior acquirer 270 and the operator behavior determiner 280. The other components provided in the operation supporter 12 are the same components as those provided in the operation supporter 10 configuring the operation support system 1 according to the first embodiment shown in FIG. 1. Therefore, in the following description, in the components of the operation supporter 12, the same components as provided in the work operation supporter 10 according to the first embodiment, is assigned the same reference numerals, and a detailed description of each configuration will be omitted, will be described only about the operation supporter 12 and the different components and the operation from the operation supporter 10 of the first embodiment.

The operation supporter 12 is, similar to the operation supporter 10 of the first embodiment, a portable terminal device carried by the field operators to perform a variety of operations in the installed facilities in the plant. And then, the operation supporter 12 provides functions to support the field operators, using the maps in the plant, and presenting the field operators the operation contents to be performed in each of the facility. Moreover, the operation supporter 12 includes a function of determining a behavior of the field operators, in addition to the functions provided in the operation supporter 10 of the first embodiment. The components and functions provided in the operation supporter 12, similarly to the operation supporter 10 of the first embodiment, for example, a personal computer (PC), a portable information terminal (tablet), a portable communication terminal device (smart phone). In the following description, similarly to the operation supporter 10 of the first embodiment, each of the components of the operation supporter 12 is described as being provided in the mobile communication terminal.

The position information detector 110 detects the current position information of the current position of the operation supporter 12, and supplies it to the operator behavior determiner 280.

The supporter behavior acquirer 270 detects (acquires) movement of the operation supporter 12, that is, the field operators behavior carrying the operation supporter 12, by detecting an acceleration or an angular velocity gained to the operation supporter 12, for each predetermined time interval. The supporter behavior acquirer 270 includes, for example, an acceleration sensor or a gyro sensor. The supporter behavior acquirer 270, detects information indicating the movement of the operation supporter 12 (hereinafter, referred to as "supporter behavior information" which is also referred to as "device behavior information"), and supplies it to the operator behavior determiner 280. The supporter behavior acquirer 270 may transmit the supporter behavior information, for example, to server 20 via a communication device and a wireless communication network (not shown) provided in the operation supporter 12.

The operator behavior determiner 280 determines the behavior of the field operators carrying the operation supporter 12 based on the current position information received from the position information detector 110 and the behavior information received from the supporter behavior acquirer 270. More specifically, the operator behavior determiner 280 determines the position of the field operators on the inspection route based on the current position of the operation supporter 12 displayed as the current position information. Moreover, the operator behavior determiner 280 determines, for example, that they are walking and they stop or the like, and determines the moving state and the amount of movement of the field operators based on the change of the current position of the operation supporter 12 displayed as the current position information. Furthermore, the operator behavior determiner 280 determines the moving state and the amount of movement of the field operators, for example, determines that they are moving their hands or the like, based on changes of the acceleration or the angular velocity gained to the operation supporter 12 displayed as the supporter behavior information.

Then, the operator behavior determiner 280 determines the field operators behavior based on the respective determination results of the field operators position on the inspection route, the state and the amount of the movement of the field operators. For example, when the position of the field operators is on the inspection route, and when the amount of movement of field operators is determined to be changed, the field operators are determined to be in moving state such as the field operators being headed to the next inspection target facilities. Further, for example, in the case that the state cannot be judged as the move has continued longer than a predetermined time period, when the amount of the behavior of the field operator is determined to be large, are performing the inspection operation at the current location. Furthermore, for example, in the case that a state in which the judgment cannot be made has continued longer than a predetermined time period, that is, when it is determined that the field operators are on the inspection route, the moving amount of the field operators has not been changed, and the moving amount of the field operators is small, then the operator behavior determiner 280 determines that the field operator is stopping and confusing due to the unexpected abnormality of the facilities, or that the field operator is confirming the trouble portions or the like. Moreover, the method of determining the behavior of the operator behavior determiner 280 is not limited to the method described above. A variety of determination methods using the technique of existing behavior recognition are available.

The operator behavior determiner 280 supplies information (hereinafter, referred to as "operator behavior information") indicating the behavior of the determined field operators, the field operators position on the inspection route, the field operators transferring state and the amount of transferring, and the field operators moving state and the amount of moving, to the inspection information processor 220. The operator behavior determiner 280 may transmit the operator behavior information to server 20, for example, via the communication device and the wireless communication network (not shown) included in the operation supporter 12.

The inspection information processor 220 transmits and receives information regarding the inspection operation performed in the plant the field operators carrying the operation supporter 12 to and from the server 20 via the communication device and the wireless communication network (not shown), similarly to the inspection information processor 120 configured to the operation supporter 10 of the first embodiment. At this time, the inspection information processor 220 transmits and receives, based on the operator behavior information received from the operator behavior determiner 280, information regarding the inspection operation with the server 20. For example, in a case that the field operators behavior included in the operator behavior information represents that they go to the next inspection target facilities, the inspection information processor 220 receives or acquires information of the routine operation associated with the facilities which the field operators subsequently inspecting, from the server 20 in advance. And then the inspection information processor 220 receives or transmits the acquired information regarding the routine operation between pluralities of the operation supporter 130. Further, for example, when the field operator behavior included in the operator behavior information represents that the field operators stand still due to the unexpected trouble of the facilities, the inspection information processor 220 receives or acquires the inspection history data associated with the facilities arranged around the current position of the field operators. Then, the inspection information processor 220 supplies the inspection history data acquired as information of the atypical operation from the server 20 to the operation supporter 130.

The operation supporter 130 performs processing for realizing the respective functions to support the field operators based on the respective data or information received from the inspection information processor 220.

With such a configuration, the operation supporter 12 determines the behavior of the field operators performing the inspection of each facility while carrying the operation supporter 12 and moving the plant sequentially, and performs to support depending on the behavior of the determined field operators. As described above, in the operation supporter 12, the inspection history data stored in data storage 210 included in the server 20, includes information associated with the behavior of the field operators, to support depending on the behavior of the determined field operators.

Figure 8:
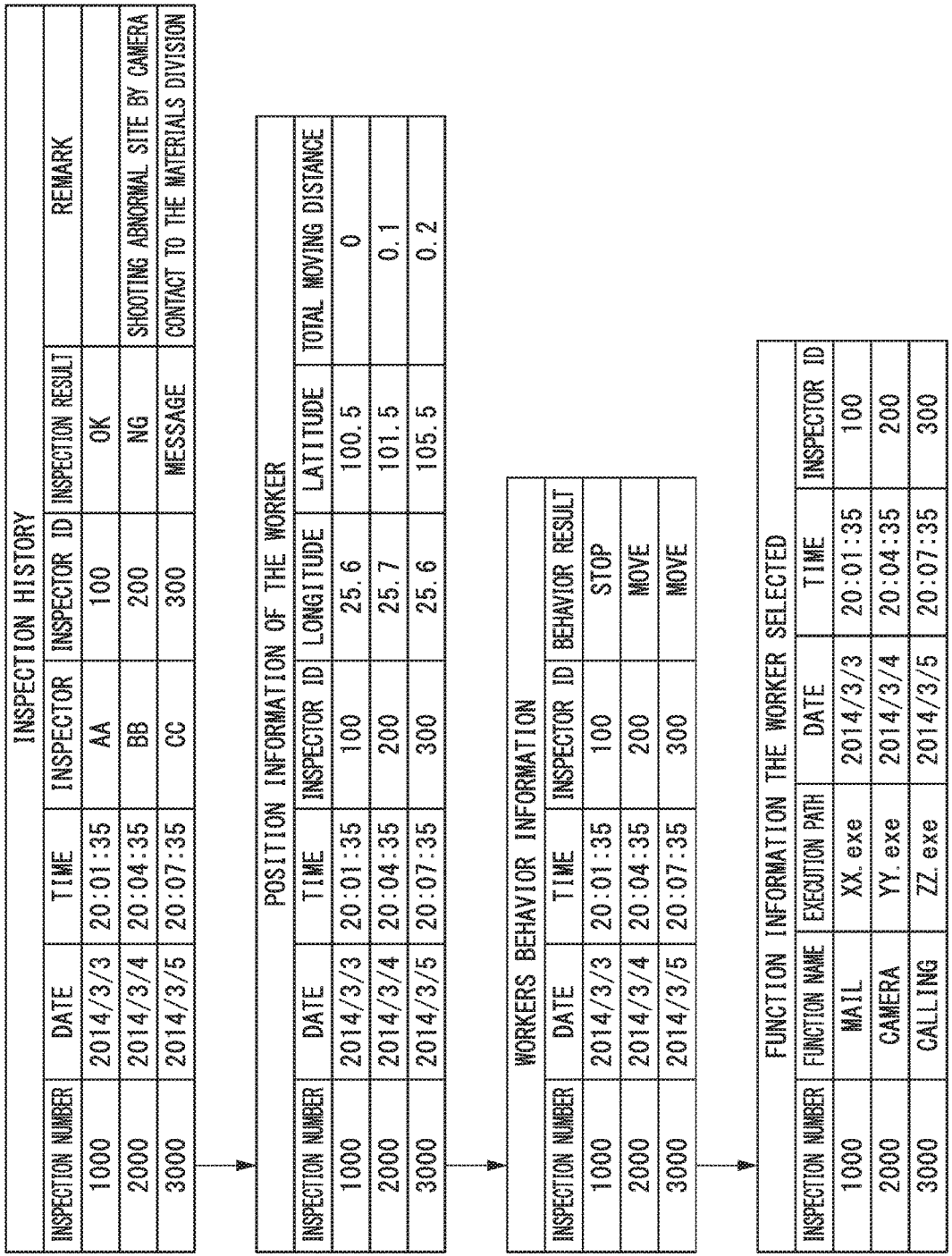
FIG. 8 is a diagram showing an example of a structure of data used when the operation support device presents the support method list in the operation support system according to the second embodiment of the present invention.

Here, the inspection history data will be described of a configuration that includes information associated with the behavior of the field operators. FIG. 8, in the operation support system 2 of the second embodiment, is a diagram showing an example of a structure of data used when the operation supporter 12 presents the support method list. FIG. 8 shows an example of the configuration of the inspection history data or atypical operation information for the operation supporter 12 presenting the support method list in a case that the field operators find the unexpected abnormality of the facilities. An example of the configuration of the inspection history data shown in FIG. 8 is further associated with information regarding behavior of the field operators with the configuration of the inspection history data in the first embodiment shown in FIG. 4. That is, the example of the configuration of the inspection history data shown in FIG. 8 includes an example similar to information of the configuration of the inspection history data shown in FIG. 4. Accordingly, in the description of the configuration of the inspection history data shown in FIG. 8, a detailed explanation regarding the similar information to the configuration of the inspection history data shown in FIG. 4 will be omitted, and only information different configuration from the inspection history data shown in FIG. 4 will be described.

The "position information of the field operators" of the inspection history data shown in FIG. 8 further includes information of a "total moving distance" as information regarding the behavior of the field operators. The total moving distance is information indicating distance where the field operators moved (amount of moving) determined by the operator behavior determiner 280, based on change of the current position of the operation supporter 12 which the current position information indicates.

The operator behavior information is set to the inspection history data shown in FIG. 8 as the operator behavior information. The operator behavior information may include the inspection number, the date, the time, the inspection ID, and the behavior result. Here, each of the inspection ID, the date, the time, and the inspector number, is the same information as each of the inspection history, the field operator position information, the inspection number of the field operators selected function information, the date, the time, and the inspector number shown in FIG. 4. The behavior result is information representing the field operators behavior of which the operator behavior determiner 280 determined based on the current position information and the movement information. More particularly, it is information representing the field operators behavior of which the operator behavior determiner 280 determined based on the respective determination results, such as the field operators positions on the inspection route, the field operators moving state and amount of movement, and the field operators moving state and the amount of the movement.

The inspection history data shown in FIG. 8, are associated with the inspection history, the field operator position information, the operator behavior information, and the field operators selected function information by the inspection number, and manages information regarding the support method of the unexpected trouble of the facilities.

Thus, the inspection history data shown in FIG. 8, are associated with various kinds of information such as the inspection history of the respective facilities, the field operator position and behavior, and the function to be activated. The function selector 133 determines the position of the facilities which the unexpected troubles are found, based on the field operator position information and the operator behavior information in the inspection history data. And then the function selector 133 generates the support method list associated with respective facilities arranged around the determined position. More specifically, the function selector 133 confirms the total-moving distance represented in the field operator position information in the inspection history data and the represented in the field operator position information in the inspection history data. If the total moving distance represents 0 and the behavior result represents stop, the function selector 133 determines the supporting position is the facilities position of which the unexpected trouble is found. Then, the function selector 133 generates and represents the support method list associated with the facilities arranged at a position closer to the longitude and the latitude included in the field operator position information in the inspection history data.

Thereby, the operation support system 2 performs support the field operators carrying the operation supporter 12 and operating the inspection of each of the facilities arranged in the plant, while communicating with the operation supporter 12 and the server 20. In this case, the operation support system 2 determines whether the field operators have found troubles such as the unexpected abnormality of the facilities based on the field operator behavior. And then, if the operation support system 2 determines that the field operators find the facilities troubles, the operation support system 2 generates and represents the support method list associated with the facilities arranged around the current location of the field operators.

The support method list to be represented to the field operators in a operation support system 2 is the same as the example of the support method list being to be presented to the field operators in a operation support system 1 of the first embodiment shown in FIG. 5 or FIG. 6. Therefore, detailed description thereof is omitted. In the operation support system 2 of the second embodiment, the operation of the step U1 among the step U1 to step U3 of the operation support system 2 of the second embodiment is different from the step U1 of the operation support system 1 of the first embodiment of the first embodiment. That is, only the tapping the "abnormality discovery" button Bc1 and the current position on the inspection route map, that is, the operation according to the operation to request the displaying the support method list by the field operators, changes to the operation associated with the determination result of the field operators behavior by the operator behavior determiner 280. Therefore, the detailed description regarding the operation to represent the field operators the support method list in the operation support system 2 will be omitted. Further, the detailed description of the routine inspection in the operation support system 2 of the first embodiment will be omitted, because of being similar to the routine inspection, which is steps N1 to step N5, in the operation support system 1.

As mentioned above, in the second embodiment, if the operation support system 2 determines the field operators behavior, and determines that the field operators found problems such as the unexpected abnormality of the facilities, the operation support system 2 presents the support method list representing the past support method associated with the facilities arranged around the current position of the field operators. Then, even the operation support system 2 of the second embodiment, supports the operation of the field operators associated with the trouble, similarly to the operation support system 1 of the first embodiment. Thus, even in the operation support system 2 of the second embodiment, it is possible to obtain the same effect as the operation support system 1 of the first embodiment, such as the reduction of the time required for the search of the material to support to the trouble, the realization of the immediate associated with the trouble, and the realization of the support in the appropriate support method to the trouble.

Moreover, the operation support system 2 of the second embodiment automatically presents the support method list based on a determination result of the behavior of the field operators. The operation support system 2 of the second embodiment can present the support method list associated with the facilities that unexpected trouble discovered, even though the field operators are not aware of the operation requesting the presentation of the support method list.

For the operation support system 2 in the second embodiment, it was described that the configuration of the operator behavior determiner 280 determines whether the field operators found the unexpected troubles, utilizes the supporter behavior information representing the behavior of the operation supporter 12 which the supporter behavior acquirer 270 acquired. However, the utilizing method of utilizing the configuration of the supporter behavior information which the supporter behavior acquirer 270 supplied is not limited to the configuration and the utilizing method as described above. For example, the operator behavior determiner 280 can deliberately utilize the supporter behavior information which the supporter behavior acquirer 270 supplied to the determination of the field operators operation at the time of requesting the representation of the support method list. In other words, the field operators can utilize the operation the supporter behavior acquirer 270 for requesting the presentation of the support method list. In this case, for example, when the supporter behavior information indicating that the operation supporter 12 is in the state of different acceleration and angular velocity which are different from those of the routine inspection operation, such as swinging the operation supporter 12, so-called, shaking, is input to the supporter behavior acquirer 270, the operator behavior determiner 280 determines that it is an operation the field operators requesting the support method list. Thus, skilled field operators who are familiar with the support method against the trouble of the facilities, do not intentionally request the presentation of the support method list. Less experienced field operators who are not familiar with the trouble of the facilities, intentionally request the presentation of the support method list. Thus, it is possible to represent the support method list along with the demands of the field operators.

Note that in the operation support system 2 of the second embodiment, the operation supporter 12 determines the behavior of the field operators based on the current position information and the supporter behavior information. And then, the operation supporter 12 presents the support method list when the field operators discover the problems such as the unexpected abnormality of the facilities. The determination processing of the field operators behavior may be required to a large processing capability. Thus, it is also possible to adopt a configuration to reduce the processing capability required to the operation supporter 12.

Third Embodiment

Figure 9:
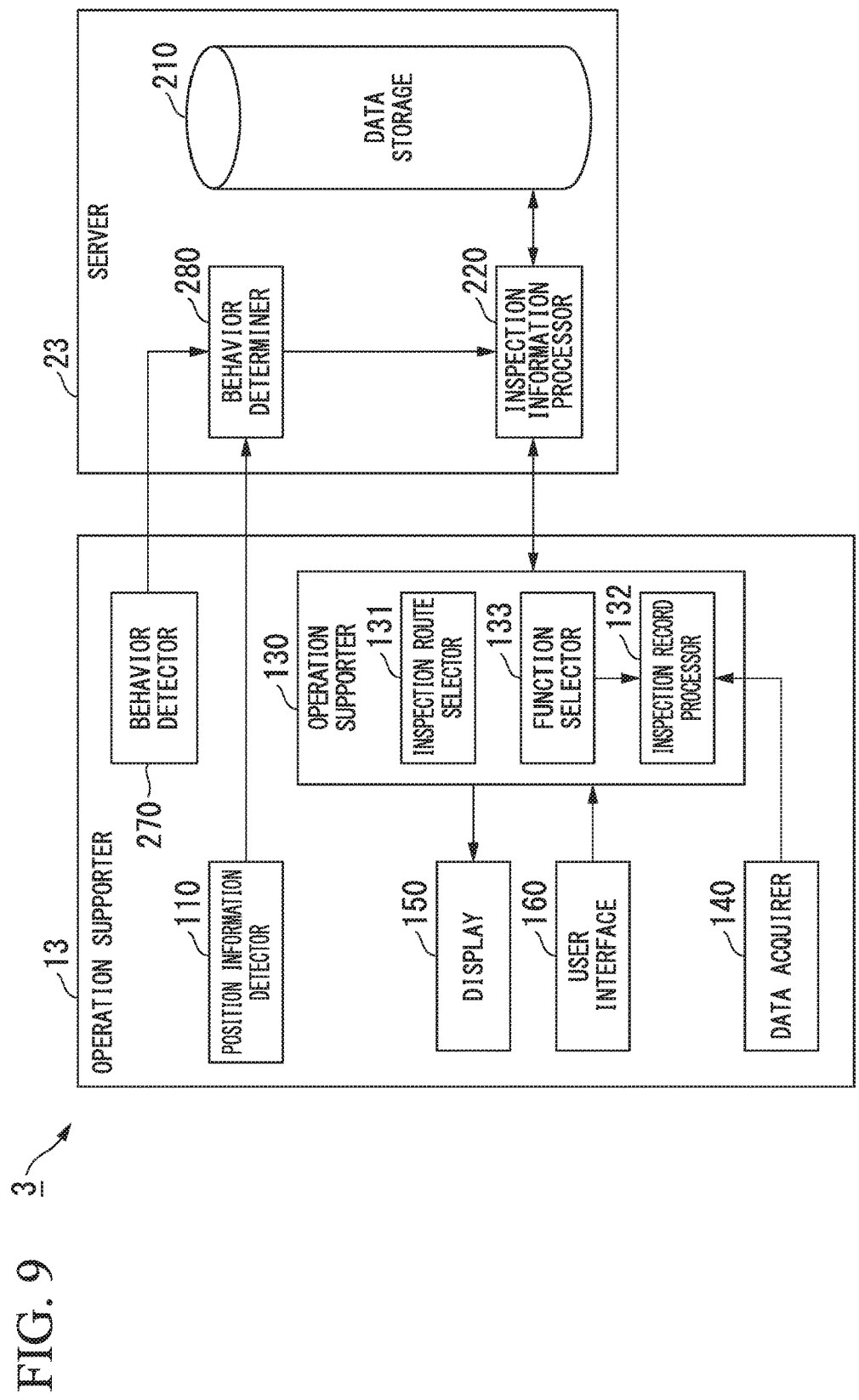
FIG. 9 is a block diagram showing a schematic configuration of an operation support system according to the third embodiment of the present invention.

A third embodiment of the present invention will be described below. FIG. 9 is a block diagram showing a schematic configuration of an operation support system according to the third embodiment of the present invention. The operation support system 3 includes at least one operation supporter 13 and a server 23. The operation support system 3 of the third embodiment is the support system for supporting the operation of the field operators performing the inspection operation and the trouble-shooting in the installed facilities in the plant, same as the operation support system 2 of the second embodiment. However, in the operation support system 3, a changing of the configuration is applied to reduce the processing capacity required to the operation supporter 12 included in the operation support system 2 of the second embodiment. Therefore, in the operation support system 3 shown in FIG. 9, the operation supporter 12 included in the operation support system 2 changes to the operation support 13, and the server 20 changes to the server 23.

In the operation support system 3, the operation supporter 13 and the server 23 are connected to each other in a wireless communication network constituted in the plant. In the plant, the field operators make their rounds carrying the operation supporter 13, inspecting or trouble-shooting to each of the facilities. The operation support system 3 includes a plurality of operation supporter 13 which the each of the field operators carries similarly to the operation support system 2 of the second embodiment. In the following description, in order to make the description easy, same as the operation support system 2 of the second embodiment, the operation support system 3, as shown in FIG. 9, includes a single operation supporter 13 and a single server 23.

The respective configuration components configured to the operation support system 3 includes the same configuration components as the respective configuration components configured to the operation support system 2 of the second embodiment shown in FIG. 7. Therefore, in the following description, in the configuration components of the operation support system 3, according to the same reference numerals are assigned to the configuration components of the operation support system 2 of the second embodiment, the same detailed description regarding to each of the components will be omitted, and only the different configuration components between the operation support system 3 and the operation support system 2 of the second embodiment will be described.

The operation supporter 13 includes the position information detector 110, the operation supporter 130, data acquirer 140, the display 150, the user interface 160, and the supporter behavior acquirer 270. The operation supporter 13 is the configuration deleting the inspection information processor 220 and the operator behavior determiner 280 from the second embodiment. The inspection information processor 220 is configured to the operation supporter 12 included in the operation support system 2 of the second embodiment.

The operation supporter 13 is a portable terminal device carried by the field operators to perform a variety of operations in the installed facilities in the plant, similarly to the operation supporter 12 of the second embodiment. The operation supporter 13 has a plurality of functions to support the field operators according to represent such as the operation contents performed in each of the facilities and the maps of the plant to the field operators. The configuration components and functions provided in the operation supporter 13, similarly to the operation supporter 12 of the second embodiment realized, for example, by a personal computer (PC), a portable information terminal (tablet), a portable communication terminal device (smart phone). In the following description, similarly to the operation supporter 12 of the second embodiment, each of the configuration components of the operation supporter 13 is described as being provided in the mobile communication terminal device.

The position information detector 110 transmits or supplies the detected current position information indicating the current position of the operation supporter 13 via the communication device and the wireless communication network (not shown) included in the operation supporter 13 to the server 23.

The supporter behavior acquirer 270 transmits the supporter behavior information detected the movement of the operation supporter 13 via the communication device and the wireless communication network (not shown) included in the operation supporter 13 to the server 23.

The operation supporter 130 performs a process for realizing the respective functions for supporting the field operators, based on the respective data and information transmitted or received from the server 23 via the communication device (not shown) included in the wireless communication network and the operation supporter 13.

The server 23 communicates with each of the operation supporter 13 via the wireless communication network constituted in the plant, and transmits and receives data and information with the operation supporter 13. The server 23 includes data storage 210, the inspection information processor 220, and the operator behavior determiner 280. The server 23 includes the inspection information processor 220 and the operator behavior determiner 280. The inspection information processor 220 is configured to the operation supporter 12 included in the operation support system 2 of the second embodiment.

The behavior determiner 280 determines the behavior of the field operators carrying the operation supporter 13 based on the current position information and the movement information, similarly to the operator behavior determiner 280 included in the operation supporter 13 in the operation support system 2 of the second embodiment. In the operation support system 3, each of the current position information and the movement information is transmitted or received from the position information detector 110 or the supporter behavior acquirer 270 included in the operation supporter 13 via the wireless communication network. The behavior determiner 280 supplies the operator behavior information indicating the behavior of the field operators carrying the operation supporter 13 being determined to the inspection information processor 220.

The inspection information processor 220 transmits and receives information regarding the inspection operation carrying the operation supporter 13 in the plant, with the server 23 via the communication device and the wireless communication network (not shown), similarly to the inspection information processor 220 included in the operation supporter 13 in a operation support system 2 of the second embodiment.

The operation support system 3 determines the behavior of the field operators carrying the operation supporter 13 and inspecting each of the facilities installed in the plant, and supports according to the determined field operators behavior while communicating with the operation supporter 13 and the server 23, similarly to the operation support system 2 of the second embodiment. In the operation support system 3, the operator behavior determiner 280 included in the server 23 determines the behavior of the field operators inspecting the each of the facilities, while moving sequentially in the plant and carrying the operation supporter 13. The inspection information processor 220 sends (supplies) data and information associated with the behavior of the field operators which the operator behavior determiner 280 determined to the operation supporter 13. Therefore, the operation support system 3 can decrease the processing power required for the operation supporter 13 because the operation supporter 13 does not need to determine the behavior of the field operators.

The configuration of the inspection history data stored in data storage 210 provided in the server 23 in the operation support system 3 is similar to the configuration of the inspection history data stored in data storage 210 provided in the server 20 in the operation support system 2 of the second embodiment shown in FIG. 8, detailed descriptions thereof will be omitted. Moreover, the support method list to be presented to the field operators in the operation support system 3, similar to the operation support system 2 of the second embodiment, is the same as an example of the support method list to be presented to the field operators in the operation support system 1 of the first embodiment shown in FIG. 5 or FIG. 6, for which detailed descriptions thereof will be omitted. Also, the operation and the routine inspection of the operation support system 3 and the operation at the time of presenting the support method list to field operators are similar to the operation in the operation support system 2 of the second embodiment, detailed descriptions thereof will be omitted.

As mentioned above, even the operation support system 3 of the third embodiment, similarly to the operation support system 2 of the second embodiment, determines the behavior of field operators, and if the operation support system 3 determines that the field operators find the unexpected abnormality of the facilities, represents the support method list past support methods have been shown to support to the facilities arranged around the current location of the field operators. Then, even the operation support system 3 of the third embodiment, similarly to the operation support system 2 of the second embodiment, assists the operation of the field operators for the trouble. Thus, even the operation support system 3 of the third embodiment, can acquire the same effect as the operation support system 1 of the first embodiment and the operation support system 2 or the second embodiment, such as the shortening the time required to search of the material to support to the trouble, the realization of immediate response to the trouble, and the realization of support in the appropriate support method to the trouble etc.

Moreover, the operation support system 3 of the third embodiment, performs the process of determining the behavior of the field operators by the server 23. Therefore, in the operation support system 3 of the third embodiment, it is possible to decrease the processing capability required for the operation supporter 13. Furthermore, the operation support system 3 of the third embodiment, can also be expected that it is possible to determine the behavior of field operators more accurately, and in a higher definition, due to the processor with high capability provided in the server 23 performs the processing of determining the behavior of the field operators.

In the operation support system 2 of the second embodiment and the operation support system 3 of the third embodiment, the configuration of the operator behavior determiner 280 determining the behavior of the field operators has been described, based on the operator behavior information representing the operation supporter 12 or the behavior of the operation supporter 13, which the detected supporter behavior acquirer 270 provided in the operation supporter 12 or the operation supporter 13. However, the configuration of determining the behavior of field operators is not limited to the above-described configuration, it can be considered that various configurations. For example, it is also possible to adopt the configuration that the field operators attach such as the sensors for determining the behavior of field operators, and determine the behavior of field operators on the basis of information the attached sensor detected.

Fourth Embodiment

Figure 10:
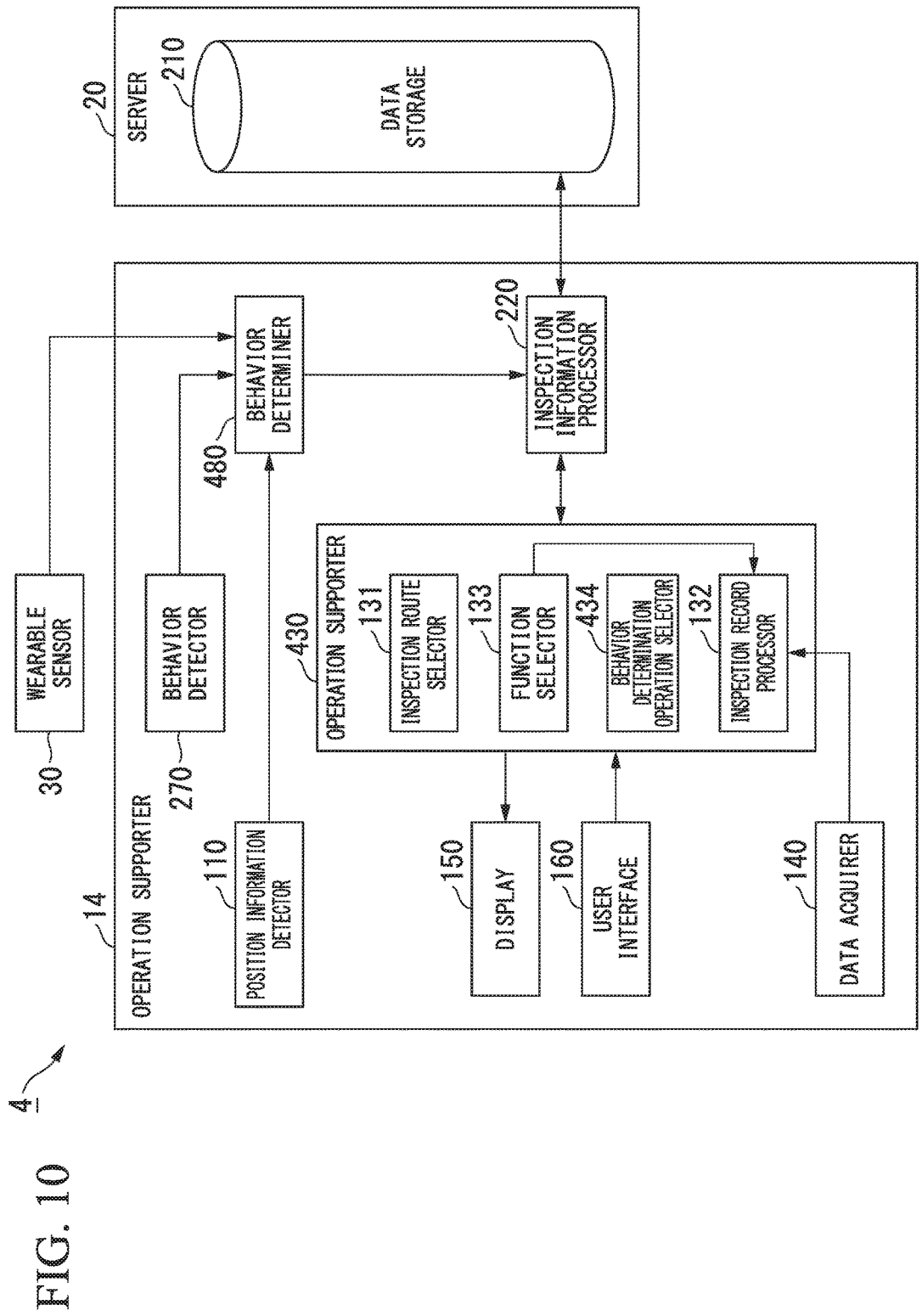
FIG. 10 is a block diagram showing a schematic configuration of an operation support system according to the fourth embodiment of the present invention.

Next, a fourth embodiment of the present invention will be described. FIG. 10 is a block diagram showing a schematic configuration of the operation support system according to the fourth embodiment of the present invention. The operation support system 4 includes at least one operation supporter 14, the server 20, and the wearable sensor 30. The operation support system 4 of the fourth embodiment is the support system supporting the operation of the field operators performing the inspection operation and the troubleshooting in the installed facilities in the plant, similarly to the operation support system 2 of the second embodiment.

In the operation support any system 4, the operation supporter 14 and the server 20 are connected by the wireless communication network provided in the plant. The field operators carry the operation supporter 14 and visit in the plant in the state of wearing the wearable sensor 30, and inspect and to trouble-shoot in each of the facilities. The operation support system 4, similar to the operation support system 2 of the second embodiment, includes a plurality of operation supporter 14 in which each of the field operators carries. Therefore, the operation support system 4 includes a wearable sensor 30 which the field operators wear and utilize in combination with the operation supporter 14. However, in the following descriptions, for ease of description, the operation support system 4, as shown in FIG. 10, includes the single operation supporter 14 and the wearable sensor 30, and the server 20.

The operation support system 4 shown in FIG. 10 the operation supporter 12 configured as the operation support system 2 of the second embodiment shown in FIG. 7, changes to the operation supporter 14, the operation support system 4 further includes a wearable sensor 30. That is, the server 20 included in the operation support system 4 is similar to the server 20 included in the operation support system 2 of the second embodiment. Therefore, in the following description, detailed descriptions of the server 20 will be omitted.

The wearable sensor 30 is attached to the field operators to perform various tasks in the facilities installed in the plant. Then, the wearable sensor 30 detects (acquires) the movement of the field operators by detecting (acquiring) such as an acceleration or an angular velocity at which the field operators move for each predetermined time interval. The wearable sensor 30 may be a motion sensors mounted at a position capable of detecting (acquiring) in detail the behavior of the field operators, such as, the operating position of limbs. The wearable sensor 30, for example, includes an acceleration sensor or an angular velocity or the like. The wearable sensor 30 is provided in the operation support system 4 for the purpose of detecting (acquiring) the behavior of the field operators accurately than the behavior acquirer 270 provided in the operation supporter 14. Thus, each of the sensors included in the wearable sensor 30 is preferably higher precision than respective sensors included in the behavior acquirer 270 provided in the operation supporter 14. The wearable sensor 30 may include sensors for measuring information of a living body, such as the heart rate and the amount of perspiration of the field operators. The wearable sensor 30 is, for example, connected to the operation supporter 14 via the short-range wireless communication such as Bluetooth (registered trademark). The wearable sensor 30 supplies information (hereinafter, referred to as "detailed behavior information") representing the detected field operators behavior (which may include information of the measured living body) to the operation supporter 14.

The operation supporter 14 includes a position information acquirer 110, an inspection information processor 220, an operation supporter 430, a data acquirer 140, a display 150, a user interface 160, a behavior acquirer 270, and an operator behavior determiner 480. The operation supporter 14 is a configuration which the operation supporter 130 included in the operation support system 2 of the second embodiment is changed to the operation supporter 430, and the operator behavior determiner 280 included in the operation support system 2 of the second embodiment is changed to the operator behavior determiner 480. Note that the operation supporter 14 also includes a short-range wireless communication device (not shown) for supplying the detailed behavior information received (acquired) from the wearable sensor 30. The other components provided in the operation supporter 14 include the same components as those provided in the operation supporter 12 included in the operation support system 2 of the second embodiment shown in FIG. 7. Therefore, in the following description, in the components of the operation supporter 14, the same components as provided in the operation supporter 12 of the second embodiment are assigned the same reference numerals, and a detailed description regarding each of the components will be omitted. Then, in the operation supporter 14, only the different components and behaviors from the operation supporter 12 of the second embodiment will be described.

The operation supporter 14, similarly to the operation supporter 12 of the second embodiment, a portable terminal device carried by the field operators to perform a variety of tasks in the installed facilities in the plant. The operation supporter 14 is similar to the operation supporter 12 of the second embodiment includes functions to support the field operators, such as representing the maps in the plant, and representing the operation carried out in each of the facilities to the field operators. The components and functions provided in the operation supporter 14 may be, similarly to the operation supporter 12 of the second embodiment, for example, a personal computer (PC), a portable information terminal (tablet), a portable communication terminal device (smart phone) In the following description, similarly to the operation supporter 12 of the second embodiment, each of the components of the operation supporter 14 is described as being provided in the mobile communication terminal device.

The operator behavior determiner 480 determines the behavior of the field operators carrying the operation supporter 14, based on the current position information received from the position information acquirer 110, the supporter behavior information received from the behavior acquirer 270, and the detailed behavior information received from the short-range wireless communication device (not shown). The operator behavior determiner 480 supplies the operator behavior information indicating the behavior of the field operators carrying the determined operation supporter 14 to the inspection information processor 220. The operator behavior determiner 480 may transmit the operator behavior information, for example, via a communication device and a wireless communication network (not shown) included in the operation supporter 14 to the server 20.

The determination method of the behavior of the field operators of the operator behavior determiner 480 is similar to the operator behavior determiner 280 included in the operation supporter 13 in the operation support system 2 of the second embodiment excepting that the detailed behavior information is added to information using in the determination, the detailed description thereof will be omitted. Also in the determination method of the behavior of the field operators of the operator behavior determiner 480, a variety of determination methods using the technique of existing behavior recognition are considered.

The inspection information processor 220 transmits and receives information regarding the inspection operation performed by the field operators carrying the operation supporter 14 in the plant to and from the server 20 via the communication device and the wireless communication network (not shown), similarly to the inspection information processor 220 included in the operation supporter 12 of the second embodiment. The inspection information processor 220 supplies information regarding inspection operation received or acquired from the server 20 to the operation supporter 430. In addition, the inspection information processor 220 transmits or supplies information such as the operation result and the trouble-shooting received from the operation supporter 430 to the server 20 being associated with the current position information and the operator behavior information.

The operation supporter 430, similarly to the operation supporter 130 included in the operation supporter 12 of the second embodiment, performs the processing to realize respective functions for supporting the field operators based on the respective data or information received from the inspection information processor 220. The operation supporter 430 includes an inspection route selector 131, and an inspection operation record processor 132, a function selector 133, and a behavior determination operation selector 434. The operation supporter 430 further adds a behavior determination operation selector 434 to the operation supporter 130 included in the operation supporter 12 of the second embodiment. The other components provided in the operation supporter 430 are the same components as the operation supporter 130 included in the operation supporter 12 of the second embodiment. In the following description, in the components of the operation supporter 430, the same components as provided in the operation supporter 130 included in the operation supporter 12 of the second embodiment, is allocated with the same reference numerals, and detailed descriptions of each component will be omitted. Then, in the operation supporter 430, only the different components and operating from the operation supporter 130 included in the operation supporter 12 of the second embodiment will be described.

The behavior determination operation selector 434 requests the field operators a predetermined behavior before the field operators carrying the wearable sensor 30 making their rounds in the plant in order to accurately detect the behavior of the field operators by the operator behavior determiner 480. The behavior determination operation selector 434 makes the operator behavior determiner 480 grasp (learn) the characteristics of the behavior of field operators. The behavior determination operation selector 434 requests the field operators perform the (specific) behavior. The operator behavior determiner 480 can determine more accurately the behavior of the field operators carrying the operation supporter 14, based on the detailed behavior information received from the short-range wireless communication device (not shown).

The field operators carry the operation supporter 14 attached the wearable sensor 30, perform the inspection of each facility. The operation supporter 14 performs the short-range wireless communication with the wearable sensor 30, and the operation supporter 14 can determine the behavior of the field operators more accurately, and can support the field operators depending on the behavior of the field operators.

Hereafter, the behavior of the field operators making their rounds in the operation support system 4 of the fourth embodiment will be described. As described above, in the operation support system 4, before the field operators wear the wearable sensor 30 and make their rounds in the plant, the operator behavior determiner 480 grasps or learns the characteristics of the behavior of field operators. At this time, the field operators have the operator behavior determiner 480 to grasp or learn the characteristics of the behavior of the field operators according to the procedures described below.

(Step L1): The field operators wear the sensor 30 and start the operation supporter 14 and the wearable sensor 30, and establish the short-range wireless communication between the wearable sensor 30 and operation supporter 14. Since an establishing method of the short-range wireless communication between the wearable sensor 30 and operation supporter 14 is, for example, in conformance with the standards of the short-range wireless communication such as the Bluetooth (registered trademark), detailed descriptions thereof will be omitted.

(Step L2): After establishing a short-range wireless communication between the operation supporter 14 and the wearable sensor 30, the field operators operate the user interface 160 to start the operation of the behavior determination operation selector 434. The user interface 160 accepted this operation supplies information indicating starting of the operation of the behavior determination operation selector 434 to the operation supporter 430. Accordingly, the behavior determination operation selector 434 in the operation supporter 430 generates a display image for displaying a predetermined behavior for requesting to the field operators and supplies the display image on the display 150. As a result, the predetermined behavior which the behavior determination operation selector 434 requests to the field operators is displayed (presented) on the display 150. A predetermined behavior for requesting to the field operators may include the behavior required for determining the behavior of the field operators more accurately, such as a behavior for determining that the field operators perform the inspection operation, and a behavior for determining that the field operators found unexpected troubles. In addition, a behavior when the field operators intentionally request to represent the support method list may be considered. However, in the present embodiment, the behavior determination operation selector 434 requests to the field operators, in other words, the characteristics which the operator behavior determiner 480 grasps (learned), will not particularly be defined.

(Step L3): The field operators perform a predetermined behavior displayed on the display 150. The wearable sensor 30 detected that this behavior supplies the detailed behavior information representing the behavior of the detected field operators to the operation supporter 14. Accordingly, the operator behavior determiner 480 supplies information requesting a quality confirmation of the behavior of the determined field operators, with the operator behavior information representing the behavior of the field operators which is determined based on the detailed behavior information received from the short-range wireless communication device (not shown), to the operation supporter 430 via the inspection information processor 220. Accordingly, the behavior determination operation selector 434 generates a display image for displaying the operator behavior information and the quality confirmation which determined the current behavior and display (presentation) on the display 150. As the method for the quality confirmation of the currently determined the operator behavior information, for example, a method of generating a display image for the field operators selecting whether to change the behavior representing the determined operator behavior information and displaying (presenting) on the display 150 are considered, in the present invention, the method for the quality confirmation of the operator behavior information may not particularly be defined.

(Step L4): The field operators confirm the current determined operator behavior information displayed on the display 150 to operate the user interface 160 to input the result of the confirmation of the operator behavior information, that is, information indicating the quality of operator behavior information to the operation supporter 14. The user interface 160 accepted this operation supplies information representing the quality of the inputted operator behavior information to the operation supporter 430. The behavior determination operation selector 434 supplies information representing an adaptable determination method of the current behavior of the field operators based on the detailed behavior information to the operator behavior determiner 480 via the inspection information processor 220, in the case which information representing the quality of the inputted operator behavior information represents "Yes". Accordingly, the operator behavior determiner 480, hereinafter, uses the adopted determination method in determination of the field operators behavior based on the detailed behavior information received from the short-range wireless communication device (not shown).

On the other hand, in the case where information indicating the Yes/No of the input operator behavior information indicates "No", the behavior determination operation selector 434 supplies information to the operator behavior determiner 480 via the inspection information processor 220. Information indicates not to adopt the determination method of the behavior of the field operators performed this time based on the detailed behavior information. The behavior determination operation selector 434 generates a display image displaying a predetermined behavior to which the field operators are requested on the display 150 again, and have the display 150 display or present on the display image 150. The behavior determination operation selector 434 may generate a display image for displaying other predetermined behavior requesting to the field operators on the display 150, and may display or present it on the display 150.

(Step L5): The field operators, similar to the step L3, perform the requested and the predetermined behavior displayed on the display 150.

Hereafter, the field operators repeat step L3 to step L5, until the operator behavior information determined as "Yes" is confirmed. The field operators may repeat steps L2 to step L5 several times, which are other than the operation for starting the operation of the behavior determination operation selector 434, and may confirm a plurality of the operator behavior information determined "Yes". As a result, the field operators may select a plurality of types of determination method which the operator behavior determiner 480 determines the behavior of the field operators. That is, the field operators may have the operator behavior determiner 480 grasp or learn a plurality of characteristics of behavior of field operators.

Using such steps described above, in the operation support system 4, the field operators have the wearable sensor 30 grasp or learn the characteristics of the behavior of the field operators. And then, the field operators go to the site which is the facilities of the inspection target, according to an inspection route displayed on the operation supporter 14. Then, the field operators perform the operation for each of the facilities. As a result, in the operation support system 4, the operation supporter 14 determines more accurately the behavior when the field operators find the trouble such as the unexpected abnormality of the facilities. And thereby, the field operators can be presented the support method list by the operation supporter 14 associated with the facilities having been determined that the unexpected abnormality of the facilities have found.

In the operation support system 4, the server 20 includes data storage 210. In the operation support system 2, also the server 20 includes data storage 210. Since the configuration of the inspection history data stored in data storage 210 in the operation support system 4, is the same as the configuration of the inspection history data stored in data storage 210 in the operation support system 2, shown in FIG. 8, a detailed description thereof will be omitted. Moreover, the support method list, to be presented to the field operators in the operation support system 4, is the same as the example of the support method list to be presented to the field operators in the operation support system 1 of the first embodiment shown in FIG. 5 or FIG. 6. Thus, detailed descriptions thereof will be omitted. Furthermore, the behavior of the routine inspection operation in the operation support system 4 and the behavior when the field operators are presented with the support method list, are similar to the behavior in the operation support system 2 of the second embodiment, detailed descriptions thereof will be omitted.

As mentioned above, if it is determined that the field operators found the troubles such as unexpected abnormality of the facilities, similarly to the operation support system 2 of the second embodiment, the operation support system 4 of the fourth embodiment determines the behavior of the field operators, and shows the support method list representing the past support methods to support to the facilities arranged around the current location of the field operators. Then, the operation support system 4 of the fourth embodiment, similarly to the operation support system 2 of the second embodiment, assists the operation of the field operators associated with the trouble. Thus, the operation support system 4 of the fourth embodiment can obtain the same effect as the operation support system 1 of the first embodiment, the operation support system 2 of the second embodiment, and the operation support system 3 of the third embodiment, such as the reduction of the time to search the material for response to the troubles, the realization of immediate response to the troubles, and the realization of response in appropriate response method to troubles.

Moreover, in the operation support system 4 of the fourth embodiment, the wearable sensor 30 determines the behavior of the field operators, in addition to the behavior acquirer 270 included in the operation supporter 14. The operation support system 4 of the fourth embodiment can determine more accurately and more precisely the behavior of the field operators than the operation support system 2 of the second embodiments. The operation supporter 14 can present the support method list associated with the facilities being determined that the field operators found the unexpected trouble.

As mentioned above, according to the embodiments of the present invention, if the field operators found the troubles such as unexpected abnormality of the plant when the field operators carrying the operation supporter which is applied the operation support system make their rounds within the plant, the operation support system 4 presents the support method list represented the past support method which the field operators dealt with in the facilities installed around the current position of the operation supporter, that is, the current location of the field operators. Thus, in the embodiments of the present invention, it is possible to shorten the time required for the searching operation for the field operators to collect information and materials to respond to the trouble of the facilities in order to respond to the discovered unexpected problems of the facility in the office. Further, in the embodiments of the present invention, it can be determined the same support method to respond to the discovered problems of the facilities as the past support method. Thus, in the embodiments of the present invention, in the plant being applied the operation support system, it is possible to respond to immediately the unexpected trouble of the facilities, further respond to the trouble of unexpected facilities in similar quality with the previous respond.

Further, in the embodiments of the present invention, when the support method shown in the presented support method list is selected, the operation support system supports the operation of the field operators associated with the troubles by activating the functions required to perform the selected support method. Further, in the embodiments of the present invention, the field operators may induce the tasks when associated with the troubles of the facility by the presented support method list. Thus, in the embodiments of the present invention, it is possible to avoid that the field operators would respond to the troubles with the wrong support method. Thus, in the embodiments of the present invention, it is possible to perform the operation of troubleshooting in a suitable method to the discovered troubles of the facilities in the plant applied the operation support system.

Further, in the embodiments of the present invention, the operation support system determined the state that the field operators found the unexpected troubles based on the field operators behavior. Thus, the facilities in the embodiments of the present invention, without consciousness of the field operators to the operation method for requesting the presentation of the support method list to the operation supporter, it is possible to present the support method list that associate with the facilities which found the unexpected problems.

Further, in the embodiments of the present invention, it is also possible to determine the state which found an unexpected trouble of the facilities based on the field operators behavior, by the server constituting the operation support system not only the operation supporter. Thus, in the embodiments of the present invention it is possible to reduce the processing capacity for determining the behavior of field operators required for the operation supporter. In this case, in the embodiments of the present invention, it is assumed that the processor of high processing capability provided in the server performs the determination of the field operator behavior. It is possible to carry out the determination in higher definition and more accurately.

Further, in the embodiments of the present invention, the wearable sensor is also possible to determine the state that found an unexpected trouble of the facilities based on the field operator behavior in combination with the operation supporter. Thus, in the embodiments of the present invention, it is possible to determine the field operator behavior in higher definition and more accurately to present the support method list associated with the facilities being found the unexpected trouble of the facilities.

For example, a program for realizing the processes performed by the individual components configuring an operation support system in the present embodiment records on a computer-readable recording medium to read the recording medium on the recorded program in the computer system, such as the respective components in the operation supporter 10 configuring the operation support system 1 shown in FIG. 1, and then records the program recorded on the recording medium on the computer system, to execute the program to perform the above-mentioned various operation regarding the operation supporter of the present embodiment. Note that the term "computer system" may include an OS and hardware such as peripheral devices. Moreover, "computer system", in the case utilizing a WWW system, homepage providing environment (or display environment) also included. The "computer-readable recording medium", a flexible disk, a magneto-optical disk, ROM, a writable nonvolatile memory such as a flash memory, a portable medium such as a CD-ROM, a hard disk or the like incorporated in the computer system It refers to the storage device.

Furthermore, the "computer-readable recording medium" may include the medium that holds a program for a predetermined period such as the volatile memory (e.g. DRAM (Dynamic Random Access Memory)) in a computer system to be a server or a client when the program transmitted the program through a communication line such as a network or a telephone line such as the Internet. Further, the program may be transmitted from the computer system which stores the program in a storage device or the like, via a transmission medium, or by a transmission wave in the transmission medium to another computer system. Here, a "transmission medium" for transmitting the program refers to a medium having a function of transmitting information, such as a network (communication network) such as a communication line such as the a telephone line. Further, the above-mentioned program may be the one for realizing a part of the above functions. Furthermore, the program may be a so-called differential file (differential program) which is the program realizing the above-described functions in combination with a program already recorded in the computer system.

As described above, the embodiments of the present invention have been described with reference to the drawings, the specific configurations are not limited to these embodiments, and also various modifications without departing from the scope of the present invention can be included.

What is claimed is:

1. An operation support system for supporting an operation to each facility installed in a plant, the operation support system comprising:
  a data storage that stores historical data which represent information regarding operations performed to the facility as history, and
  at least one operation support device portable by a field operator,
  wherein the at least one operation support device comprises:
    an inspection information processor configured to add information regarding the operation performed to the facility to the historical data, and to output a current position information regarding a position of the at least one operation support device where the operation was performed to the facility that is associated with the historical data to the data storage;
    a processor-based operation supporter configured to:
      compare the current position information to a past position information of a position where the operation was performed to the facility, the past position information being included in the historical data;
      determine which position of the past position is closest to the current position;
      display operation information regarding a plurality of solution operations performed to the facility installed on the past position which is determined to be closest to the current position; and
      execute one or more functions to perform at least one solution operation selected from the plurality of solution operations displayed;
    a processor-based supporter behavior detector configured to detect behavior of the operation support device, and output supporter behavior information representing the detected behavior; and
    a processor-based operator behavior determiner configured to:

determine behavior of the field operator, based on at least one of a position of the field operator based on the current position information, an amount of movement of the field operator based on the current position information, and an amount of motion of the field operator based on the supporter behavior information; and output operator behavior information representing the determined behavior of the field operator, wherein the operator behavior determiner is configured to determine that the behavior of the field operator is in a stopping state in a case in which the position of the field operator is on an inspection route representing the order of performance of one or more operations to each facility in the plant, the amount of movement is not changed, and the amount of motion of the field operator is small, and wherein in a case in which the operator behavior determiner determines that the behavior of the field operator is in the stopping state, the operation supporter is configured to display the plurality of solution operations included in the historical data and associated with a facility at the current position of the operation support device.

2. The operation support system according to claim 1, wherein the operation supporter is configured to start a function which performs the solution operation selected on a list of the solution operations displayed.

3. The operation support system according to claim 2, wherein the operation supporter is configured to display the information of the solution operation associated with the facility if an inspection information is output, which indicates abnormality in the facility at the current position with an inspection list of operations to be performed to the facility, included in the historical data.

4. The operation support system according to claim 2, wherein the operation support system comprises the inspection information processor outside the operation support device, wherein the processor-based supporter behavior detector of the operation support device is configured to detect behavior of the operation support device, and to output supporter behavior information representing the detected behavior of the operation support device, wherein the operation support system further comprises a second processor-based operator behavior determiner configured to determine behavior of the field operator, based on the current position information and the supporter behavior information, and output operator behavior information representing the determined behavior of the field operator;

wherein the inspection information processor is configured to acquire the historical data associated with the facility from the data storage if the operator behavior information represents finding abnormality in the facility, and wherein the operation supporter is configured to display information of the solution operation based on the historical data which the inspection information processor acquired.

5. The operation support system according to claim 1, wherein the operation supporter is configured to display information of one or more available solution operations sorted in term of abnormality in accordance with one or more predetermined conditions.

6. The operation support system according to claim 5, wherein the operation supporter is configured to add the information of the solution operation selected to the historical data, and sort the one or more available solution operations based on selected numbers of the one or more available solution operations.

7. The operation support system according to claim 5, wherein the operation supporter is configured to add the information of the solution operation selected to the historical data, and sort the one or more available solution operations based on recentness of date or time of selections to the one or more available solutions.

8. The operation support system according to claim 1, wherein the operation supporter is configured to display a solution list including each series of one or more solution operations sorted associated with a respective abnormality in sequence.

9. The operation support system according to claim 8, wherein the operation supporter is configured to display the solution list, including a selectable first operation and unselectable other operations to be performed after the first operation in the series of the one or more operations included in the solution list.

10. The operation support system according to claim 1, wherein the operation supporter is configured to:

display the current position of the operation support device in a map illustrating arrangement of respective facilities with inspection route representing the order of performance of one or more operations to each facility in the plant; and if abnormality is detected in the facility at the current position of the operation support device, associate the facility in which the abnormality is detected with a facility in the map; and display information of the solution operation associated with the facility in the map.

11. The operation support system according to claim 1, wherein the inspection information processor is configured to acquire the historical data associated with the facility from the data storage if the operator behavior information represents finding the abnormality in the facility, and wherein the operation supporter is configured to display a list of the solution operations based on the historical data acquired by the inspection information processor.

12. The operation support system according to claim 11, wherein the operation support system further comprises a processor-based second supporter behavior detector which is attachable to the field operator, and is configured to detect the behavior of the field operator carrying the operation support device and to output second supporter behavior information representing the detected behavior, and wherein the operator behavior determiner is configured to determine the behavior of the field operator based on the current position information, the supporter behavior information, and the second supporter behavior information, and output the operator behavior information representing the determined behavior of the field operator.

13. The operation support system according to claim 1, wherein the operator behavior determiner is configured to determine that the behavior of the field operator is in a moving state in a case in which the position of the field operator is on an inspection route representing the order of performance of one or more operations to each facility in the plant and the amount of movement of the field operator is changed.

14. The operation support system according to claim 1, wherein the operator behavior determiner is configured to determine that the behavior of the field operator is in an inspection operation state in a case in which the position of the field operator is on an inspection route representing the order of performance of one or more operations to each facility in the plant, the amount of movement is not changed, and the amount of motion of the field operator is large.

15. An operation support device, which is portable by a field operator, for supporting an operation to each facility installed in a plant, the operation support device comprising:
   an inspection information processor configured to add information regarding the operations performed to the facility to historical data representing the operation performed in the facility, and to output a current position information regarding a position of the operation support device where the operation is performed to the facility that is associated with the historical data;
   a processor-based operation supporter configured to:
      compare the current position information to a past position information of a position where the operation was performed to the facility, the past position information being included in the historical data;
      determine which position of the past position is closest to the current position;
      display operation information regarding a plurality of solution operations performed to the facility installed on the past position which is determined to be closest to the current position; and
      execute one or more functions to perform at least one solution operation selected from the plurality of solution operations displayed;
   a processor-based supporter behavior detector configured to detect behavior of the operation support device, and output supporter behavior information representing the detected behavior; and
   a processor-based operator behavior determiner configured to:
      determine behavior of the field operator, based on at least one of a position of the field operator based on the current position information, an amount of movement of the field operator based on the current position information, and an amount of motion of the field operator based on the supporter behavior information; and
      output operator behavior information representing the determined behavior of the field operator,
   wherein the operator behavior determiner is configured to determine that the behavior of the field operator is in a stopping state in a case in which the position of the field operator is on an inspection route representing the order of performance of one or more operations to each facility in the plant, the amount of movement is not changed, and the amount of motion of the field operator is small, and
   wherein in a case in which the operator behavior determiner determines that the behavior of the field operator is in the stopping state, the operation supporter is configured to display the plurality of solution operations included in the historical data and associated with a facility at the current position of the operation support device.

16. An operation supporting method for supporting an operation to each facility installed in a plant, the operation supporting method comprising:
   by an operation support device,
   adding information regarding the operation performed to the facility to historical data representing the operation performed in the facility, and outputting current position information regarding position where the operation was performed to the facility that is associated with the historical data to data storage;
   comparing the current position information to a past position information of a position where the operation was performed to the facility, the past position information being included in the historical data;
   determining which position of the past position is closest to the current position;
   displaying operation information regarding a plurality of solution operations performed to the facility installed on the past position which is determined to be closest to the current position;
   executing one or more functions to perform at least one solution operation selected from the plurality of solution operations displayed;
   detecting behavior of the operation support device, and outputting supporter behavior information representing the detected behavior; and
   determining behavior of a field operator, based on at least one of a position of the field operator based on the current position information, an amount of movement of the field operator based on the current position information, and an amount of motion of the field operator based on the supporter behavior information, and
   outputting operator behavior information representing the determined behavior of the field operator,
   wherein determining the behavior of the field operator comprises determining that the behavior of the field operator is in a stopping state in a case in which the position of the field operator is on an inspection route representing the order of performance of one or more operations to each facility in the plant, the amount of movement is not changed, and the amount of motion of the field operator is small, and
   wherein in a case in which the behavior of the field operator is determined to be in the stopping state, outputting the operator behavior information comprises displaying the plurality of solution operations included in the historical data and associated with a facility at the current position of the operation support device.

* * * * *